(12) United States Patent
Hayashi et al.

(10) Patent No.: US 8,833,074 B2
(45) Date of Patent: Sep. 16, 2014

(54) EXHAUST-BYPASS VALVE OF TURBOCHARGER

(75) Inventors: Noriyuki Hayashi, Sagamihara (JP); Mitsushige Kubota, Nagasaki (JP); Takao Yokoyama, Nagasaki (JP); Masaki Tojo, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 269 days.

(21) Appl. No.: 12/918,247

(22) PCT Filed: Feb. 20, 2009

(86) PCT No.: PCT/JP2009/053028
§ 371 (c)(1),
(2), (4) Date: Aug. 18, 2010

(87) PCT Pub. No.: WO2009/107555
PCT Pub. Date: Sep. 3, 2009

(65) Prior Publication Data
US 2011/0005222 A1 Jan. 13, 2011

(30) Foreign Application Priority Data
Feb. 26, 2008 (JP) .................. 2008-045196

(51) Int. Cl.
*F02D 23/00* (2006.01)
*F01D 17/10* (2006.01)
*F01D 17/12* (2006.01)
*F02B 37/18* (2006.01)

(52) U.S. Cl.
CPC ............ *F02B 37/183* (2013.01); *F01D 17/105* (2013.01); *F05B 2220/40* (2013.01); *F01D 17/12* (2013.01); *Y02T 10/144* (2013.01)
USPC ........................................... 60/602

(58) Field of Classification Search
USPC .............................. 60/602; 251/298, 299, 339
See application file for complete search history.

(56) References Cited

U.S. PATENT DOCUMENTS 4,463,564 A * 8/1984 McInerney ...................... 60/602
5,052,362 A * 10/1991 Jenny et al. ................. 123/559.2

(Continued)

FOREIGN PATENT DOCUMENTS

DE           44 45 489 A1    6/1996
DE    10 2007 018 618 A1   10/2007

(Continued)

OTHER PUBLICATIONS

Japanese Office Action for Japanese Patent Application No. 2008-045196 mailed Apr. 3, 2012.

(Continued)

*Primary Examiner* — Thomas Denion
*Assistant Examiner* — Mickey France
(74) *Attorney, Agent, or Firm* — Birch, Stewart, Kolasch & Birch, LLP

(57) ABSTRACT

An exhaust-bypass valve capable of reducing wear of a rotating shaft to prevent controllability from deteriorating is provided. An exhaust-bypass valve (1) of a turbocharger includes a shunting passage (5) that communicates between a passage (3) at the turbine-inlet side and a passage (4) at the turbine-outlet side and a valve flap (6) that opens and closes this shunting passage (5). The valve flap (6) opens and closes to shunt a gas flowing through the passage (3) at the turbine-inlet side into the passage at the turbine-outlet side. The valve flap (6) is rotatably supported at one side thereof serving as a center-of-rotation side, and the other side thereof moves away from or towards the shunting passage (5) to open or close the shunting passage (5). A tapered portion (10) is provided at an edge on the other side. The edge is at least one of an edge of an opening of the shunting passage (5) facing the valve flap (6) and a side surface of the valve flap (6) facing the shunting passage (5).

2 Claims, 18 Drawing Sheets

(56) References Cited

U.S. PATENT DOCUMENTS

| | | | |
|---|---|---|---|
| 5,214,919 A * | 6/1993 | Jiewertz et al. | 60/602 |
| 2005/0178122 A1 * | 8/2005 | Hastings et al. | 60/602 |
| 2005/0247058 A1 | 11/2005 | Pedersen et al. | |
| 2006/0042247 A1 * | 3/2006 | Haugen | 60/612 |

FOREIGN PATENT DOCUMENTS

| | | | | |
|---|---|---|---|---|
| EP | 607523 A2 * | 7/1994 | | F02B 37/12 |
| JP | 58-2334 U | 6/1956 | | |
| JP | 58-190521 A | 11/1983 | | |
| JP | 62-8333 U | 1/1987 | | |
| JP | 63-205420 A | 8/1988 | | |
| JP | 5-30431 U | 4/1993 | | |
| JP | 6-109026 A | 4/1994 | | |
| JP | 06193517 A * | 7/1994 | | F02M 25/07 |
| JP | 2004-332686 A | 11/2004 | | |
| JP | 2006-274833 A | 10/2006 | | |
| WO | WO 2007/103860 A2 | 9/2007 | | |

OTHER PUBLICATIONS

Decision to Grant a Patent issued Apr. 2, 2013 for corresponding Japanese Patent Application No. 2008-045196.

Decision to Grant a Patent Right issued Feb. 28, 2013 for corresponding Chinese Application No. 200980106208.9.

European Extended Search Report issued Nov. 11, 2013 for European Patent Application No. 09714490.1.

* cited by examiner (1)

(2)

(1)

(2)

EXHAUST-BYPASS VALVE OF TURBOCHARGER

TECHNICAL FIELD

The present invention relates to an exhaust-bypass valve of a turbocharger.

BACKGROUND ART

Some turbochargers are provided with exhaust-bypass valves to prevent excessive gas from flowing into the turbines. An exhaust-bypass valve is a valve that opens/closes a passage communicating between the turbine inlet and the turbine outlet.

Many exhaust-bypass valves are simply structured swing valves. FIG. 30 shows a conventional exhaust-bypass valve 201 of a turbocharger. A bulkhead 202 divides a passage 203 at the turbine-inlet side from a passage 204 at the turbine-outlet side, and a shunting passage 205 communicates between the passages 203 and 204. The exhaust-bypass valve 201 is provided with a valve flap 206 for covering the shunting passage 205. The valve flap 206 is supported by an arm 206a at one side thereof, and the arm 206a is supported rotatably about a shaft 207. One end of a lever 208 is secured to the shaft 207, and opening/closing is performed as a result of the other end of the lever 208 being driven by an actuator 209. More specifically, when a shaft 209a of the actuator 209 extends, the lever 208 moves in the direction away from the passage 203 at the turbine-inlet side with the shaft 207 serving as a center of rotation, and the valve flap 206 secured to the shaft 207 also moves in the direction away from the passage 203 at the turbine-inlet side accordingly, thus causing the shunting passage 205 to open, as shown in FIG. 31. When the shaft 209a of the actuator 209 retracts, the lever 208 moves towards the passage 203 at the turbine-inlet side with the shaft 207 serving as the center of rotation, and the valve flap 206 secured to the shaft 207 also moves towards the passage 203 at the turbine-inlet side accordingly, causing the shunting passage 205 to close, as shown in FIG. 30. In the closed state, a sealing face 206b of the valve flap 206 comes into close contact with the side of the bulkhead 202 to block the shunting passage 205.

Patent Document 1:
Japanese Unexamined Patent Application, Publication No. 2006-274833

DISCLOSURE OF INVENTION

When the flow rate is to be controlled by decreasing the travel of the exhaust-bypass valve 201, a great gas pressure acts upon the valve flap 206. On the other hand, because the turbocharger is driven by engine exhaust gas and the pressure of this engine exhaust gas fluctuates, a variable load acts upon the valve flap 206.

Because the pneumatically driven actuator 209 works as a pneumatic spring, the variable load acting upon the valve flap 206 causes the valve flap 206 to extend or contract according to the degree of fluctuation of the load. If this extension/contraction is considerable, the valve repeats slight opening/closing action, resulting in possible wear of a sliding portion such as the shaft 207. If the shaft 207 of the valve is worn out, the controllability may be degraded due to increased play, and therefore, a structure for reducing such wear is desired.

The present invention has been conceived in light of the above-described circumstances, and an object thereof is to provide an exhaust-bypass valve capable of decreasing the wear of a rotating shaft to prevent controllability from being degraded.

In order to solve the above-described problem, the present invention provides the following solutions.

A first aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side. In the turbocharger, the valve flap is rotatably supported at one side thereof serving as a center-of-rotation side, the other side of the valve flap moves away from or towards the shunting passage to open or close the shunting passage, and a tapered portion is provided at an edge on the other side. The edge is at least one of an edge of an opening for the shunting passage facing the valve flap and a side surface of the valve flap facing the shunting passage.

According to this aspect, a reduced-pressure area is formed via tapering at the side remote from the rotating shaft. Because of this, the force upon the valve flap, particularly the moment, can be reduced.

A second aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein the valve flap has a center of rotation at one side thereof, the other side of the valve flap moves away from or towards the shunting passage to open or close the shunting passage, and the shunting passage is oriented from the passage at the turbine-inlet side towards an edge on the center-of-rotation side of the valve flap.

According to this aspect, because the shunting passage is angled towards the center of rotation of the valve flap, a high-pressure increased-pressure area is formed at the side adjacent to the center of rotation of the valve flap. As a result, the moment for rotating the valve flap is reduced.

A third aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein the valve flap has a center of rotation at one side thereof, the other side of the valve flap moves away from or towards the shunting passage to open or close the shunting passage, and the shunting passage guides, in a return direction, a gas flowing through the passage at the turbine-inlet side.

In short, according to this aspect, the gas flowing from the passage at the turbine-inlet side into the shunting passage changes its flow direction at an obtuse angle (an angle larger than 90°). As a result, because the dynamic pressure exerted in the shunting passage can be reduced, the variable load acting upon the valve flap decreases.

In the above-described aspects, a tapered portion may be provided at an edge on the other side, the edge being at least one of an edge of an opening for the shunting passage facing the valve flap and a side surface of the valve flap facing the shunting passage.

By doing so, because a reduced-pressure area is formed via tapering at the side remote from the rotating shaft, the force upon the valve flap, particularly the moment, can be reduced.

A fourth aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein a protrusion projecting in an inward direction of the passage at the turbine-inlet side is provided at an upstream corner of a branch where the shunting passage branches off from the passage at the turbine-inlet side.

According to this aspect, because the protrusion constricts the passage at the turbine-inlet side, the flow velocity is increased and hence the dynamic pressure increases. As a result, static pressure is exerted in the shunting passage, thus suppressing fluctuations in the pressure acting upon the valve flap.

A fifth aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein the valve flap has a center of rotation at an upstream side of the passage at the turbine-inlet side, the other side of the valve flap moves away from or towards the shunting passage to open or close the shunting passage, and a protrusion projecting in inward directions of both the passage at the turbine-inlet side and the shunting passage is provided at an upstream corner of a branch where the shunting passage branches off from the passage at the turbine-inlet side.

According to this aspect, because the protrusion constricts the passage at the turbine-inlet side, the flow velocity is increased and hence the dynamic pressure increases. As a result, static pressure is exerted in the shunting passage, thus suppressing fluctuations in the pressure acting upon the valve flap. Furthermore, because the gas flowing through the shunting passage is oriented towards the center of rotation of the valve flap, the high-pressure point is brought near the center of rotation. This can reduce the moment.

A sixth aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein urging means for applying an urging force in a direction to open the valve flap when the valve flap is completely closed or substantially completely closed is provided.

According to this aspect, when the valve flap is closed, the urging means increases the steadiness of the valve flap about the rotating shaft. Therefore, when the load applied to the valve flap becomes large, the fluctuation in rotation angle of the valve resulting from fluctuations in the load is reduced.

In the above-described aspects, a lever secured to a rotating shaft of the valve flap and an actuator that opens and closes the valve flap by applying a driving force to the lever to rotate the lever about the rotating shaft may be provided. Furthermore, the urging means may apply an urging force between the rotating shaft and a point of application of the actuator with respect to the lever.

By doing so, because the direction of the load applied to the valve flap by the gas substantially matches the direction of the load applied to the lever by the spring, partial contact between the rotating shaft of the valve flap and the bushing supporting the rotating shaft is reduced.

In the above-described aspects, a lever secured to a rotating shaft of the valve flap and an actuator that opens and closes the valve flap by applying a driving force to the lever to rotate the lever about the rotating shaft may be provided. Furthermore, a point of application of the actuator may be located between the rotating shaft and a point to which an urging force is applied to the lever by the urging means.

By doing so, the steadiness of the valve flap about the rotating shaft can be further enhanced.

In the above-described aspects, a weight may be provided at one end of the lever.

The variable load applied to the valve flap is related to the rotation speed of the engine. Furthermore, when the frequency of variable load applied to the valve flap is lower than the eigenfrequency of the valve flap about the rotating shaft, the above-described urging means has a more dramatic effect for suppressing fluctuations in rotation angle of the valve flap. With this structure, the steadiness of the valve flap about the rotating shaft is maintained by adding a weight to one end of the lever, namely, one of the upper and lower ends of the lever, to reduce the eigenfrequency. As a result, a higher wear-suppressing effect is achieved at a lower rotation speed of the engine. The weight may be integrated with or discrete from the lever.

A seventh aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein a control section that performs control so as to completely close the valve flap in a case where an engine torque is high and a frequency of fluctuation in gas pressure is lower than an eigenfrequency of the valve flap about a rotating shaft is provided.

In more detail, the control section receives an engine torque and a gas pressure and, based on these values, controls the actuator that opens and closes the valve flap. The engine torque may be determined based on the gas pressure. The fluctuation in gas pressure can also be determined based on the rotation speed of the engine. The control section can open the valve flap when the fluctuation in gas pressure exceeds the eigenvalue.

Under the condition of a high engine torque, the fluctuation in gas pressure becomes considerable. Because of this, the fluctuation in the load acting upon the valve flap becomes large. Furthermore, when the eigenfrequency of the valve flap about the rotating shaft becomes equal to the frequency of the variable load, there is higher risk of increasing wear or breaking the valve flap due to resonance. With this structure, when the frequency of the variable load applied to the valve flap is equal to or lower than the eigenfrequency, the valve flap is kept completely closed. As a result, not only can this resonance be prevented from occurring, but also a high wear-suppressing effect can be achieved.

An eighth aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein the valve flap includes a weight.

In short, the valve flap is constructed to be heavier than the conventional art. Normally, the valve flap is connected with some play. With this structure, as a result of the weight of the valve flap being increased, the moving speed of the valve flap is controlled to reduce the impact load. The weight may be integrated with or discrete from the lever. In addition, the valve flap becomes more robust with a larger thickness if the weight is integrated with the lever. This reduces the risk of, for example, breakage.

According to the above-described sixth aspect, the urging means may be a laminated spring.

The laminated spring has such a high vibration-damping ability that the phase of the variable load applied to the valve flap is shifted relative to the phase of the fluctuation in rotation angle about the rotating shaft, thus suppressing fluctuations in rotation angle.

In the above-described sixth aspect or the above-described structures, vibration-damping means for damping an elastic force of the urging means may be provided.

The vibration-damping ability of the spring is so high that the phase of the variable load applied to the valve flap is shifted relative to the phase of the fluctuation in rotation angle about the rotating shaft, thus suppressing fluctuations in rotation angle. Rubber, resin, and so on can be used for the vibration-damping means.

A ninth aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein a lever secured to a rotating shaft of the valve flap and an actuator that opens and closes the valve flap by applying a driving force to the lever to rotate the lever about the rotating shaft are provided, and the valve flap is provided at an opposite side of the rotating shaft from a point of application of the actuator with respect to the lever.

According to this aspect, because the direction of the load applied to the valve flap substantially matches the direction of the load applied to the lever by the point of application (joint) of the actuator, partial contact between the rotating shaft and the bushing supporting the rotating shaft is reduced.

In the above-described aspects, urging means for applying an urging force in a direction to open the valve flap when the valve flap is completely closed or substantially completely closed may be provided.

In the closed state of the valve flap, the steadiness of the valve flap about the rotating shaft increases. Therefore, when the load applied to the valve flap becomes large, the fluctuation in rotation angle of the valve resulting from fluctuations in the load is reduced.

A tenth aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein a lever secured to a rotating shaft of the valve flap and an actuator that opens and closes the valve flap by applying a driving force to the lever to rotate the lever about the rotating shaft are provided, and the valve flap and a point of application of the actuator are located on the same side from the lever when viewed along the rotating shaft.

According to this aspect, because the point of application of the actuator on the lever (i.e., the contact point of the actuator joint) comes closer to the position of the valve flap, the overhang is reduced. This reduces partial contact between the bushing and the rotating shaft.

An eleventh aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side. A bushing and a fixing member that supports the bushing are provided. A contact-area increasing section for increasing a contact area in which the bushing is in contact with the fixing member is provided at at least one end portion in the longitudinal direction of the bushing and at at least one of the bushing and the fixing member.

According to this aspect, because the contact area between the rotating shaft and the bushing increases near an edge of the bushing, the wear depth can be reduced. The contact-area increasing section includes a chamfer shape, an R shape, and so on.

In the above-described aspects, a fixing member that supports the bushing may be provided, and a gap may be formed between the bushing and the fixing member at at least one end portion in a longitudinal direction of the bushing.

Because a gap is formed at the rear surface of the bushing in this manner, the contact area with the fixing member (e.g., the housing) can be increased near an edge of the bushing.

A twelfth aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein an arm having a distal end thereof that supports the valve flap and a base end thereof that is supported rotatably is provided, and an elastic member is provided between the arm and the valve flap.

Normally, the valve flap is connected with the arm with some play to increase the adhesion of the valve flap. Because a gap is formed at this point, the valve flap collides with the arm when fluctuations in gas pressure occur. When a large impact load is produced at this time, the fluctuation in angle of the rotating shaft also becomes considerable. With this structure, however, because an elastic member is disposed between the valve flap and the arm, the fluctuation in rotation angle can be suppressed.

A thirteenth aspect according to the present invention is an exhaust-bypass valve of a turbocharger including a shunting passage that communicates between a passage at a turbine-inlet side and a passage at a turbine-outlet side and a valve flap that opens and closes the shunting passage, the valve flap opening and closing to shunt a gas flowing through the passage at the turbine-inlet side into the passage at the turbine-outlet side, wherein an arm having a distal end thereof that supports the valve flap and a base end thereof that is supported rotatably is provided, and a high damping material is provided between the arm and the valve flap.

Normally, the valve flap is connected with the arm with some play to increase the adhesion of the valve flap. Because a gap is formed at this point, the valve flap collides with the arm when fluctuations in gas pressure occur. When a large impact load is produced at this time, the fluctuation in angle of the rotating shaft also becomes considerable. With this structure, however, because the high damping material is disposed between the valve flap and the arm, the fluctuation in rotation angle can be suppressed.

According to the exhaust-bypass valve of a turbocharger of the present invention, the wear of the rotating shaft can be reduced to prevent the controllability from deteriorating.

EXPLANATION OF REFERENCE SIGNS

Figure 1:
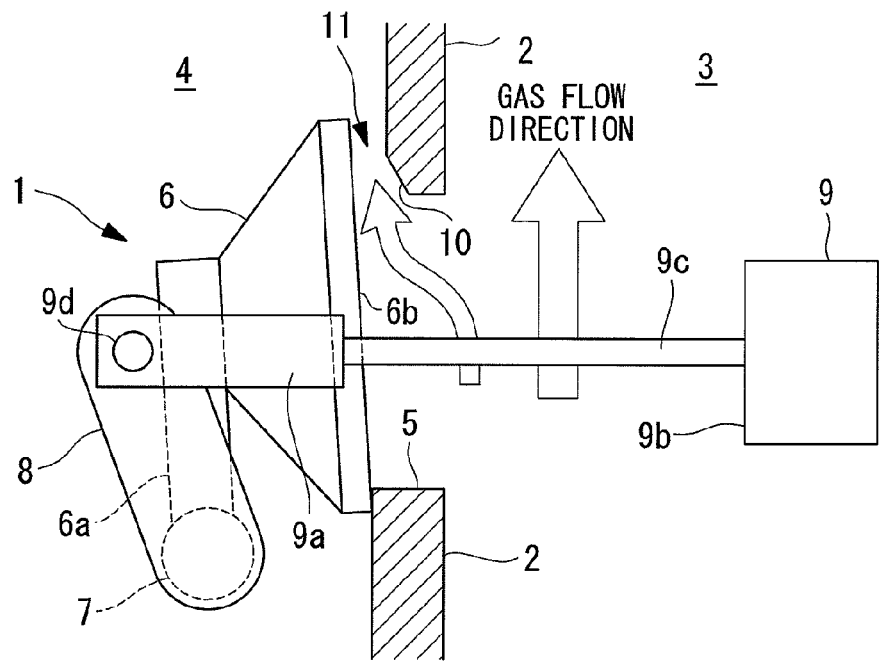
FIG. 1 is a cross-sectional view of an exhaust-bypass valve according to a first embodiment of the present invention.

1: exhaust-bypass valve
2: bulkhead
3: passage at the turbine-inlet side
4: passage at the turbine-outlet side
5: shunting passage
6: valve flap
6a: arm
6b: sealing face
7: shaft
8: lever
9: actuator
9a: joint
9b: actuator main body
9c: shaft
9d: pin
10: tapered portion
11: reduced-pressure area
12: tapered portion
13: bushing
14: housing (fixing member)
21: exhaust-bypass valve
22: bulkhead
25: shunting passage
30: increased-pressure area
31: exhaust-bypass valve
32: bulkhead
35: shunting passage
41: exhaust-bypass valve
42: bulkhead
45: shunting passage
49: protrusion
49': protrusion
51: exhaust-bypass valve
52: spring (urging means)
53: spring bearing
61: exhaust-bypass valve
62: lever
63: spring (urging means)
64: spring bearing
71: exhaust-bypass valve
72: lever 73: mass (weight)
80: control section
81: engine torque detector
82: gas pressure detector
91: exhaust-bypass valve
96: valve flap
101: exhaust-bypass valve
102: laminated spring
103: sheet (vibration-damping means)
111: exhaust-bypass valve
121: exhaust-bypass valve
124: housing (fixing member)
125: hole
126: bushing
127: flange
128: through-hole
129: chamfer
130: R portion
131: gap
140: exhaust-bypass valve
141: spring (elastic member)
201: exhaust-bypass valve
202: bulkhead
203: passage at the turbine-inlet side
204: passage at the turbine-outlet side
205: shunting passage
206: valve flap
206a: arm
206b: sealing face
207: shaft
208: lever
209: actuator
209a: shaft
X1: overhang
X2: overhang

BEST MODE FOR CARRYING OUT THE INVENTION

[First Embodiment]

Figure 2:
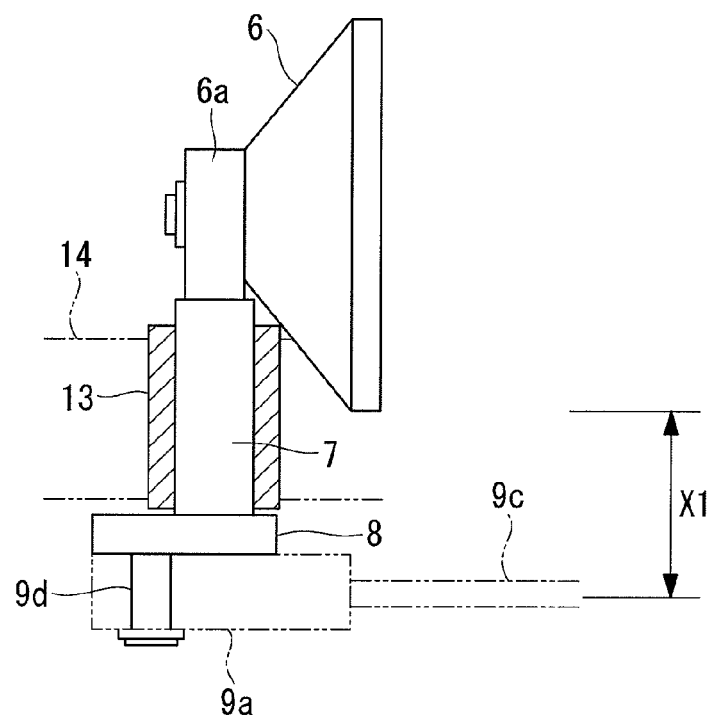
FIG. 2 is a top view of the same exhaust-bypass valve.

FIG. 1 shows an exhaust-bypass valve 1 according to a first embodiment of the present invention. FIG. 2 is a partially cut-away top view of the exhaust-bypass valve 1. In the exhaust-bypass valve 1 shown in the figure, a bulkhead 2 divides a passage 3 at the turbine-inlet side from a passage 4 at the turbine-outlet side such that a shunting passage 5 communicates between the passages 3 and 4. The exhaust-bypass valve 1 is provided with a valve flap 6 for covering the shunting passage 5. The valve flap 6 is supported by an arm 6a at one side thereof, and the arm 6a is supported rotatably about a shaft 7. One end of a lever 8 is secured to the shaft 7, and opening/closing is performed as a result of the other end of the lever 8 being driven by an actuator 9. The shaft 7 is rotatably supported by a bushing 13, which is fitted into a housing (fixing member) 14. The actuator 9, the lever 8, and the valve flap 6 are arranged in that order in the depth direction on the drawing of FIG. 1. Furthermore, a baffle is disposed between the valve flap 6 and the arm 6a.

The actuator 9 is rotatably secured to the lever 8 and is provided with a joint 9a serving as a point of application for transmitting the driving force of the actuator 9 to the lever 8 and a shaft 9c that moves the joint 9a either away from or towards an actuator main body 9b. The joint 9a is rotatably secured to one side of the lever 8 via a pin 9d. When the shaft 9c of the actuator 9 extends, the lever 8 moves in the direction away from the passage 3 at the turbine-inlet side with the shaft 7 serving as a rotating shaft, and, accordingly, the valve flap 6 secured to the shaft 7 also moves in the direction away from the passage 3 at the turbine-inlet side with the shaft 7 serving as a rotating shaft. In this manner, the shunting passage 5 opens to communicate between the passage 3 at the turbine-inlet side and the passage 4 at the turbine-outlet side. When the shaft 9c of the actuator 9 retracts, the lever 8 moves towards the passage 3 at the turbine-inlet side with the shaft 7 serving as a center of rotation, and the valve flap 6 secured to the shaft 7 also moves towards the passage 3 at the turbine-inlet side accordingly, thus closing the shunting passage 5. In the closed state, the shunting passage 5 is blocked as a result of a sealing face 6b of the valve flap 6 coming into close contact with the side of the bulkhead 2.

A tapered portion 10 is provided on the wall of the bulkhead 2 surrounding the shunting passage 5, i.e., at an edge that is adjacent to the passage 4 at the turbine-outlet side and away from the center of rotation of the shaft 7. In other words, a corner of the wall surrounding the shunting passage 5 is chamfered such that the cross-sectional area of the shunting passage 5 gradually increases in the direction from the passage 3 at the turbine-inlet side towards the passage 4 at the turbine-outlet side. Because of this, a reduced-pressure area 11 is formed between the tapered portion 10 and the valve flap 6 for accelerating a gas flow to be shunted from the passage 3 at the turbine-inlet side into the passage 4 at the turbine-outlet side.

With this structure, when the travel of the exhaust-bypass valve 1 is decreased, the pressure of the exhaust gas flowing from the passage 3 at the turbine-inlet side into the passage 4 at the turbine-outlet side decreases as the gas passes through the reduced-pressure area 11. As a result, the force, particularly the moment, applied to the valve flap 6 decreases, compared with the conventional art. Therefore, the degree of fluctuation in the force resulting from fluctuations in exhaust gas pressure can be reduced. Consequently, the wear of the rotating shaft can be reduced, thereby preventing the controllability from deteriorating.

Figure 3:
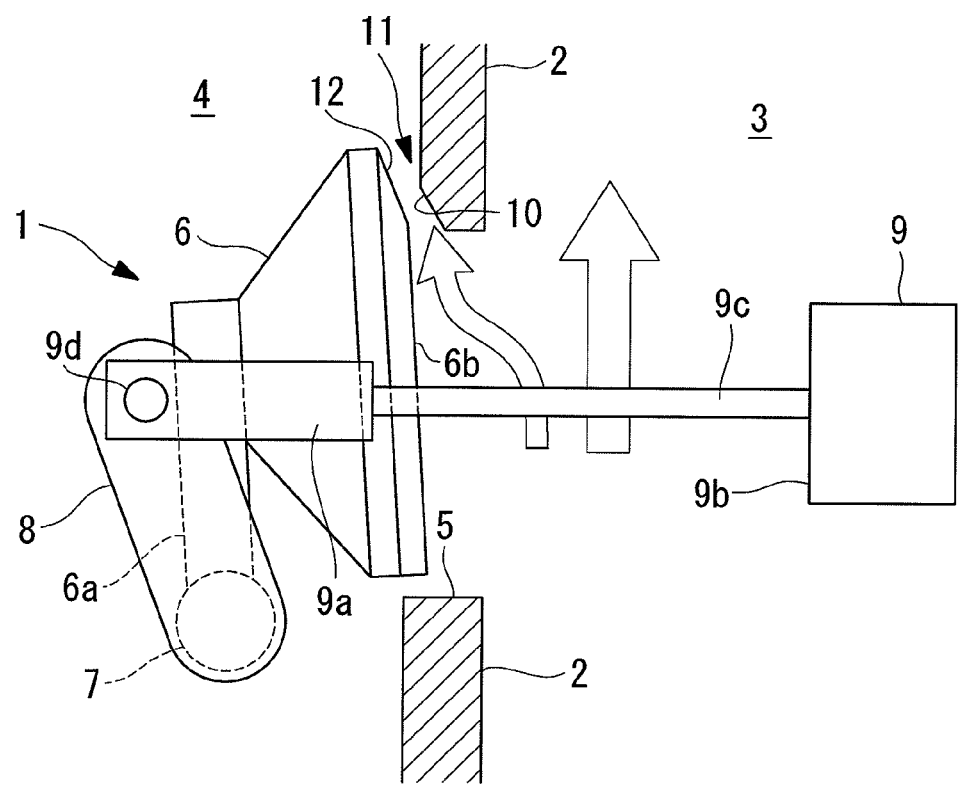
FIG. 3 is a cross-sectional view of a modification of the exhaust-bypass valve according to the first embodiment of the present invention.

In addition, the sealing face 6b of the valve flap 6 that faces the shunting passage 5 may also be provided with a tapered portion 12, as shown in FIG. 3. This means that, whereas normal valve flaps have a flat surface, the valve flap 6 according to this modification is provided with the tapered portion 12, which is formed by chamfering a corner of the surface facing the shunting passage 5, i.e., the corner that is remote from the center of rotation of the shaft 7. By doing so, a similar advantage can be afforded because the reduced-pressure area 11 is formed due to the tapered portion 10 and the tapered portion 12 in the same manner as described above.

Figure 4:
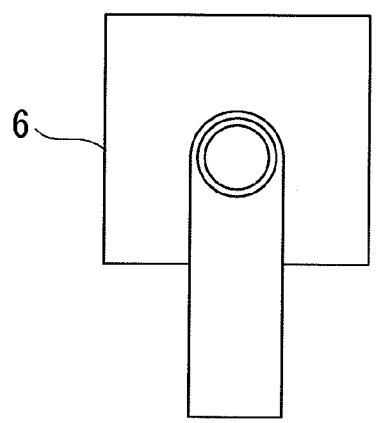
FIG. 4 is a front elevational view of the modification of the exhaust-bypass valve according to the first embodiment of the present invention.

As shown in FIG. 4, the normally circular valve flap 6 may be formed in a rectangular shape.

[Second Embodiment]

Figure 5:
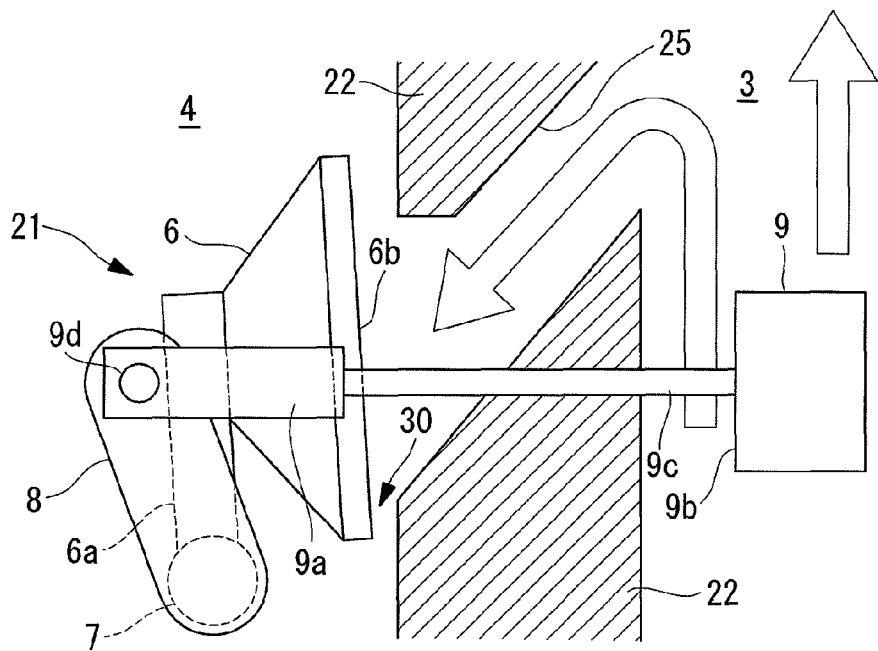
FIG. 5 is a cross-sectional view of an exhaust-bypass valve according to a second embodiment of the present invention.

FIG. 5 shows an exhaust-bypass valve 21 according to a second embodiment of the present invention. Components such as the valve flap 6 are similar to those in the above-described first embodiment. The same components as those in the first embodiment are denoted with the same reference numerals, and hence a description thereof will be omitted.

According to this embodiment, a bulkhead 22 divides the passage 3 at the turbine-inlet side from the passage 4 at the turbine-outlet side, and a shunting passage 25 communicates between the passages 3 and 4.

The shunting passage 25 is angled towards the center of rotation of the shaft 7 between the passage 3 at the turbine-inlet side and the passage 4 at the turbine-outlet side. Because of this, an increased-pressure area 30 is formed at an edge of the wall surrounding the shunting passage 25 in the passage 4 at the turbine-outlet side, i.e., the edge that is adjacent to the shaft 7.

With this structure, because the shunting passage 25 is angled towards the center of rotation of the shaft of the valve flap 6, a high pressure area (the increased-pressure area 30) is produced at the side adjacent to the center of rotation of the shaft of the valve flap 6, thereby decreasing the moment for rotating the valve flap 6. Therefore, the degree of fluctuation in the force occurring when the pressure of exhaust gas fluctuates can also be decreased. This can reduce the wear of the rotating shaft to prevent the controllability from deteriorating.

Figure 6:
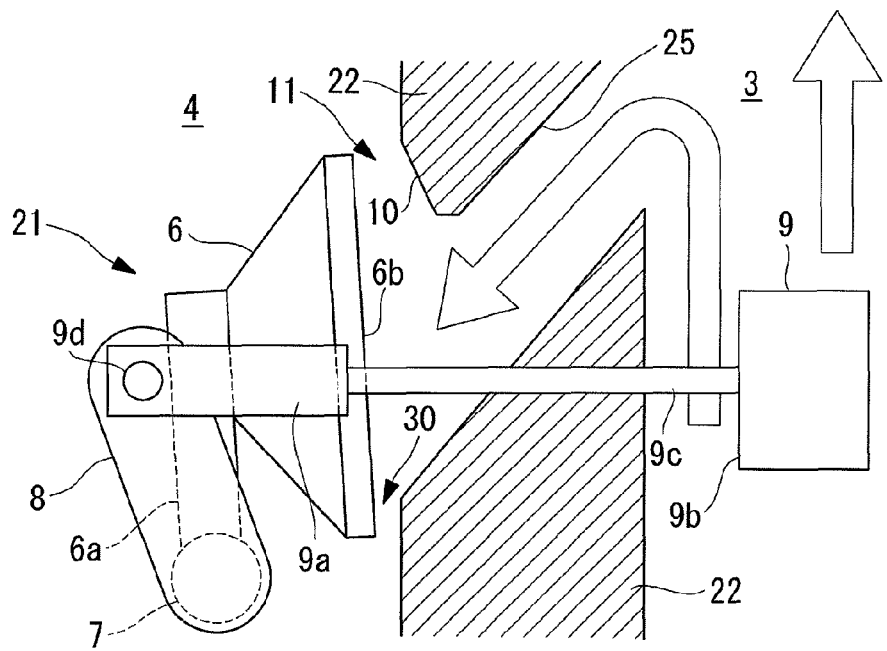
FIG. 6 is a cross-sectional view of a modification of the exhaust-bypass valve according to the second embodiment of the present invention.

In addition, the shunting passage 25 may also be provided with the tapered portion 10 described in the above embodiment, as shown in FIG. 6. According to this modification, the tapered portion 10 is formed at an edge of the opening of the shunting passage 25 that is adjacent to the passage 4 at the turbine-outlet side, i.e., the edge that is remote from the shaft 7, and this tapered portion 10 causes the reduced-pressure area 11 to be formed.

[Third Embodiment]

Figure 7:
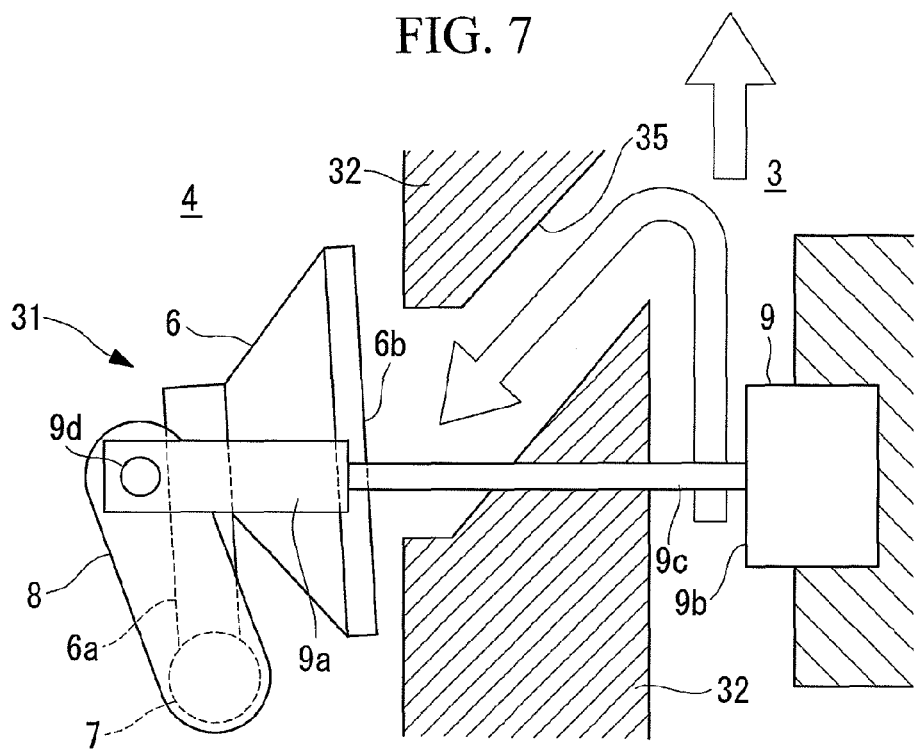
FIG. 7 is a cross-sectional view of an exhaust-bypass valve according to a third embodiment of the present invention.

FIG. 7 shows an exhaust-bypass valve 31 according to a third embodiment of the present invention. Components such as the valve flap 6 are similar to those in the above-described first embodiment. The same components as those in the first embodiment are denoted with the same reference numerals, and hence a description thereof will be omitted.

According to this embodiment, a bulkhead 32 divides the passage 3 at the turbine-inlet side from the passage 4 at the turbine-outlet side, and a shunting passage 35 communicates between the passages 3 and 4.

Near the exhaust-bypass valve 31, the passage 3 at the turbine-inlet side is substantially parallel to the sealing face 6b of the valve flap 6 of the exhaust-bypass valve 31, and the shunting passage 35 branches off from the passage 3 at the turbine-inlet side into the passage 4 at the turbine-outlet side. The shunting passage 35 is angled in a return direction from the flow through the passage 3 at the turbine-inlet side. In short, the gas flowing through the passage 3 at the turbine-inlet side enters the shunting passage 35 at an angle larger than 90° relative to the flow direction.

With this structure, because the shunting passage 35 is formed in an oblique direction returning from the flow direction of the passage 3 at the turbine-inlet side, the dynamic pressure acting upon the shunting passage 35 formed in the bulkhead 32 can be decreased, thereby decreasing the variable load applied to the valve flap 6. Therefore, the degree of fluctuation in the force occurring when the pressure of exhaust gas fluctuates can also be decreased. This can reduce the wear of the rotating shaft to prevent the controllability from deteriorating.

[Fourth Embodiment]

Figure 8:
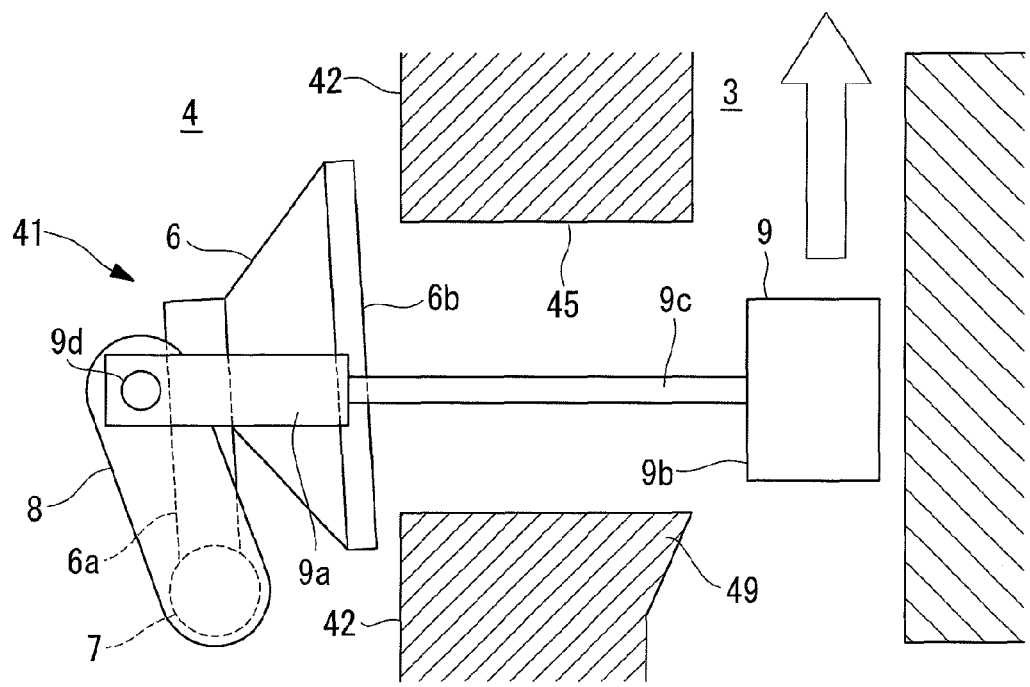
FIG. 8 is a cross-sectional view of an exhaust-bypass valve according to a fourth embodiment of the present invention.

FIG. 8 shows an exhaust-bypass valve 41 according to a fourth embodiment of the present invention. Components such as the valve flap 6 are similar to those in the above-described first embodiment. The same components as those in the first embodiment are denoted with the same reference numerals, and hence a description thereof will be omitted.

According to this embodiment, a bulkhead 42 divides the passage 3 at the turbine-inlet side from the passage 4 at the turbine-outlet side, and a shunting passage 45 communicates between the passages 3 and 4. Near the exhaust-bypass valve 41, the passage 3 at the turbine-inlet side is substantially parallel to the sealing face 6b of the valve flap 6 of the exhaust-bypass valve 41, and the shunting passage 45 branches off from the passage 3 at the turbine-inlet side into the passage 4 at the turbine-outlet side. A protrusion 49 that projects towards the center of the passage 3 at the turbine-inlet side such that the cross-sectional area of the passage 3 at the turbine-inlet side decreases is provided at an upstream corner of the shunting passage 45 branching off from the passage 3 at the turbine-inlet side.

With this structure, because the protrusion 49 constricts the passage for the main stream flowing from the turbine inlet into the turbine, the flow velocity increases, causing the dynamic pressure of the main stream to increase. As a result, a static pressure is applied to the shunting passage 45 formed in the bulkhead 42, so that fluctuations in pressure acting upon the valve flap 6 can be suppressed. Therefore, the degree of fluctuation in the force occurring when the pressure of exhaust gas fluctuates can also be decreased. This can reduce the wear of the rotating shaft to prevent the controllability from deteriorating.

Figure 9:
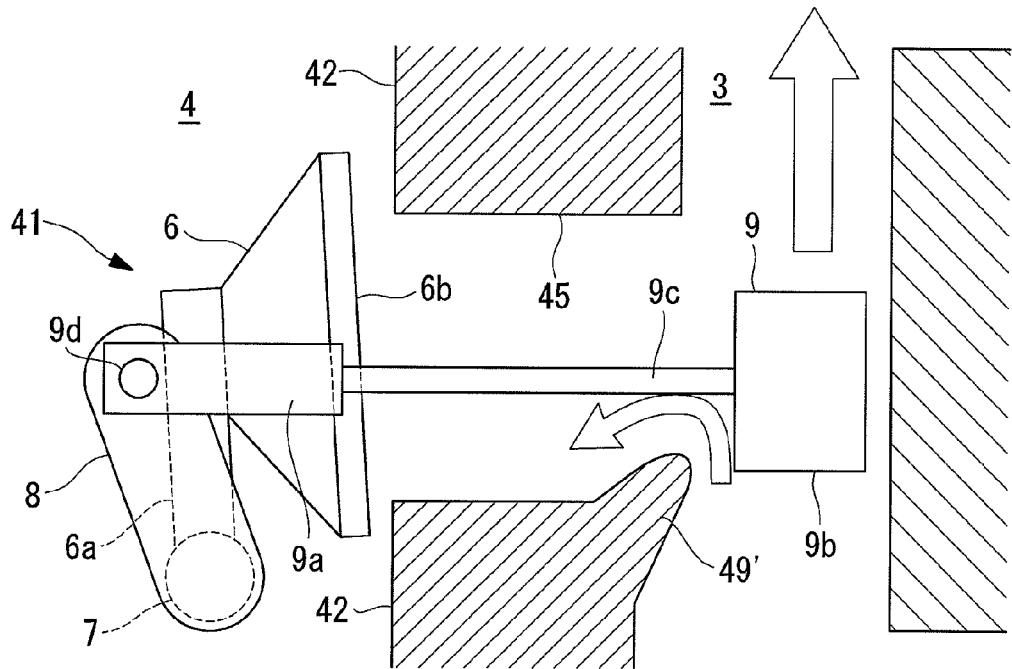
FIG. 9 is a cross-sectional view of a modification of the exhaust-bypass valve according to the fourth embodiment of the present invention.

Instead of the protrusion 49, a protrusion 49' that projects towards both the passage 3 at the turbine-inlet side and the shunting passage 45 may be provided, as shown in FIG. 9. More specifically, the protrusion 49' is provided at an upstream corner of the shunting passage 45 so as to project obliquely in inward directions of both the passage 3 at the turbine-inlet side and the shunting passage 45 in order to reduce the cross-sectional areas of both the shunting passage 45 and the passage 3 at the turbine-inlet side.

With this modification, because the protrusion 49' constricts the passage in the same manner as described above, the flow velocity increases, thereby increasing the dynamic pressure of the main stream. As a result, a static pressure is applied to the shunting passage 45 formed in the bulkhead 42, so that fluctuations in pressure acting upon the valve flap 6 can be suppressed. Furthermore, because the gas flow through the shunting passage 45 is oriented towards the center of rotation of the shaft 7, as shown in the figure, a high pressure point can be brought near the center of rotation of the shaft, thereby achieving a reduction in pressure fluctuation, as well as a reduction in moment.

[Fifth Embodiment]

Figure 10:
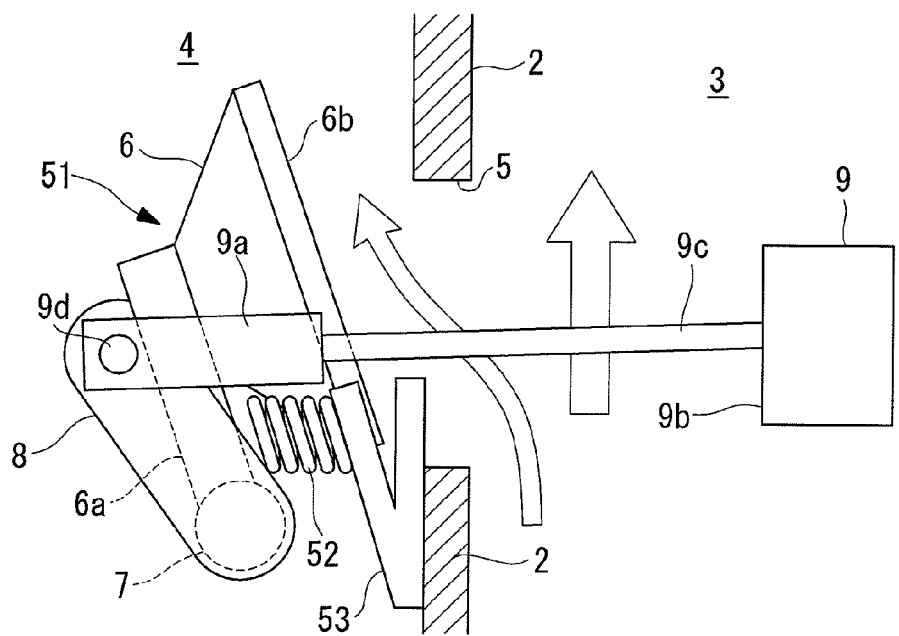
FIG. 10 is a cross-sectional view of an exhaust-bypass valve according to a fifth embodiment of the present invention, depicting a valve flap in the open state.

FIG. 10 shows an exhaust-bypass valve 51 according to a fifth embodiment of the present invention.

Components such as the valve flap 6 are similar to those in the above-described first embodiment. The same components as those in the first embodiment are denoted with the same reference numerals, and hence a description thereof will be omitted.

In the exhaust-bypass valve 51 according to this embodiment, a spring (urging means) 52 is provided between the lever 8 and the bulkhead 2. One end of the spring 52 is in contact with the lever 8, and the other end of the spring 52 is secured to a spring bearing 53 on the fixed end (housing). The shaft 7, the contact point of the spring 52, and the joint 9a at the tip of the actuator 9 are arranged in that order along the longitudinal direction of the lever 8.

Figure 11:
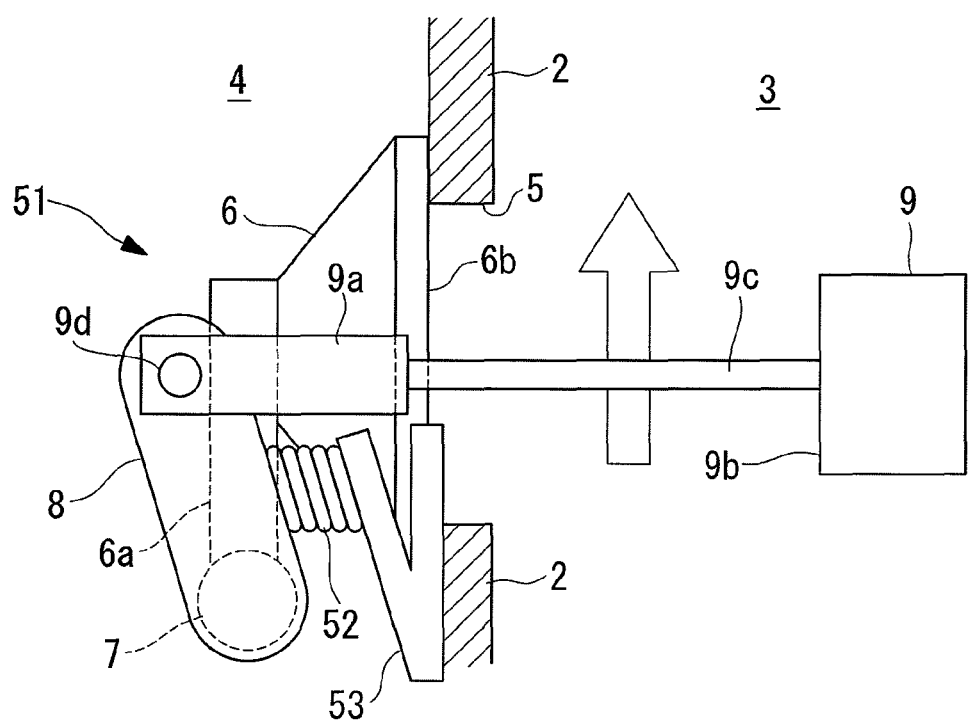
FIG. 11 is a cross-sectional view of the exhaust-bypass valve according to the fifth embodiment of the present invention, depicting the valve flap in the closed state.

The spring 52 is extended in the open state shown in FIG. 10. When the valve flap 6 is closed almost completely, as shown in FIG. 11, the spring 52 contracts and exerts an urging force in the direction to open the valve flap 6.

Figure 12:
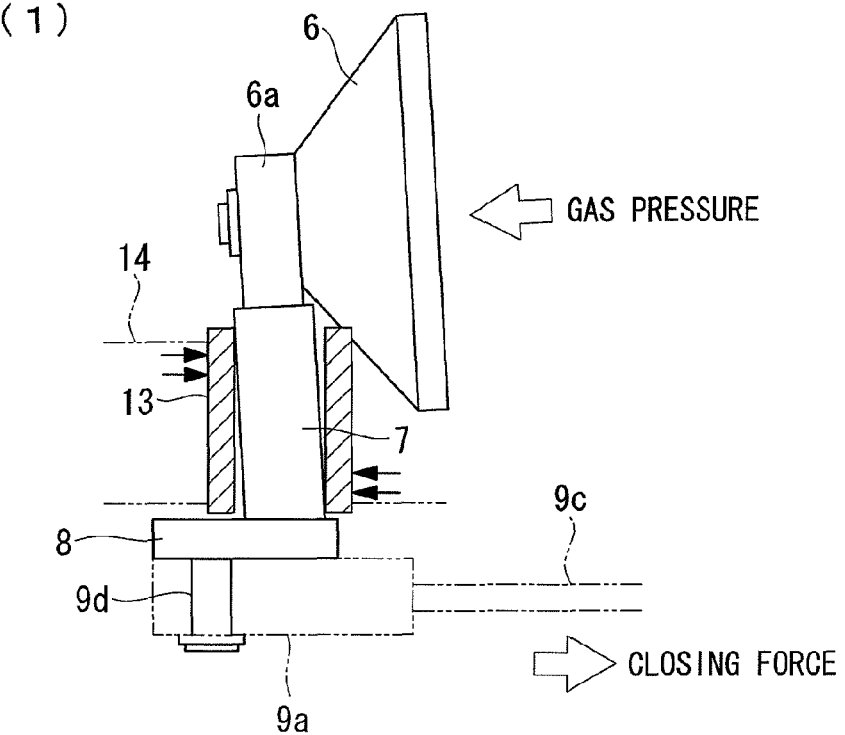
FIG. 12 shows top views of the exhaust-bypass valve according to this embodiment with a comparative example.
Figure 12:
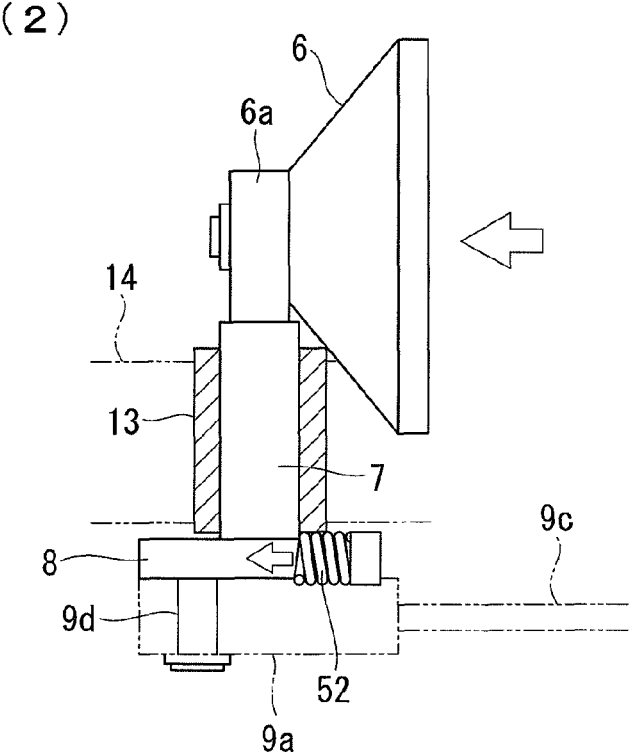

When the load applied to the valve flap 6 increases, the rotation of the valve flap 6 about the shaft 7 becomes more steady due to the urging force of the spring 52, thereby reducing the fluctuation in rotation angle of the valve flap 6 resulting from fluctuations in the load. Consequently, the slide distance between the shaft 7 and the bushing 13 supporting the shaft 7 is reduced, thus preventing wear. Furthermore, because the direction of the load applied to the valve flap 6 by the gas substantially matches the direction of the load applied to the lever 8 by the spring 52, partial contact between the shaft 7 and the bushing 13 can be decreased. More specifically, if no spring is provided (comparative example), as shown in FIG. 12(1), a force is exerted on the bushing 13 so as to tilt the shaft 7 because the direction of the pulling force of the actuator 9 is opposite to the direction of gas pressure. In this embodiment, however, the force to tilt the shaft 7 is reduced due to the urging force of the spring 52, as shown in FIG. 12(2).

For the spring 52, any elastic member can be used. For example, a leaf spring is also acceptable.

[Sixth Embodiment]

Figure 13:
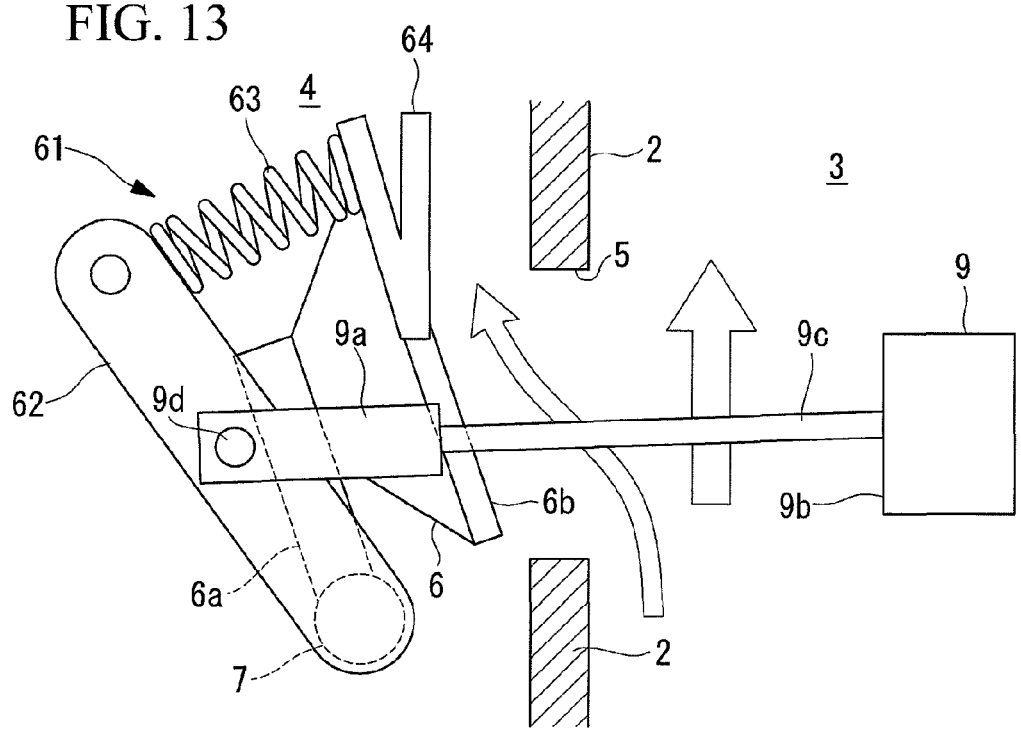
FIG. 13 is a cross-sectional view of an exhaust-bypass valve according to a sixth embodiment of the present invention, depicting a valve flap in the open state.
Figure 14:
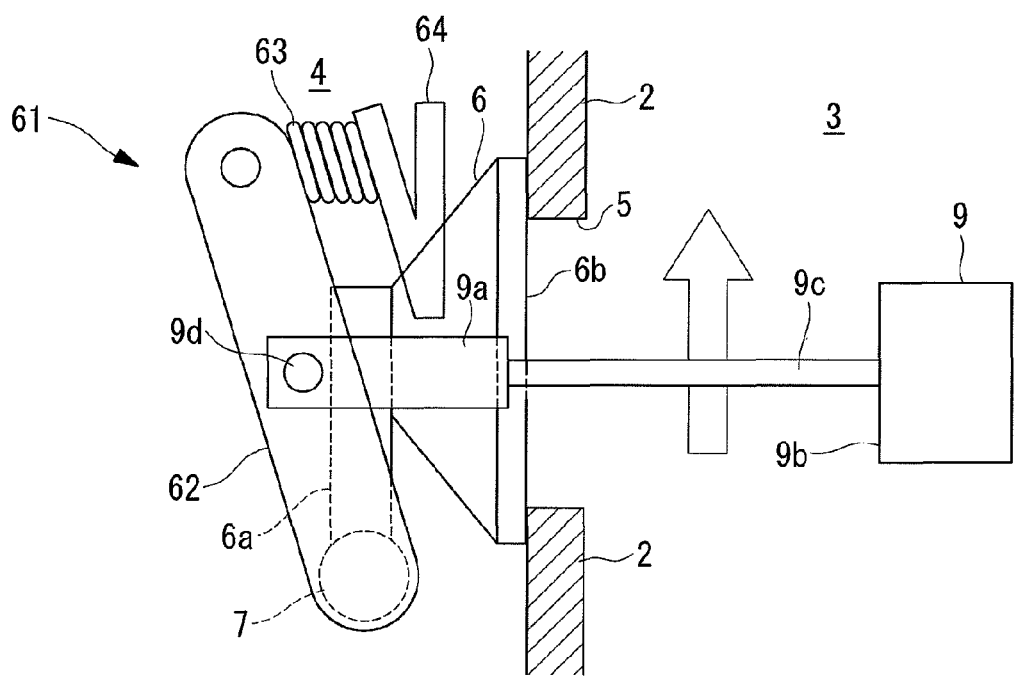
FIG. 14 is a cross-sectional view of the exhaust-bypass valve according to the sixth embodiment of the present invention, depicting the valve flap in the closed state.

FIG. 13 shows an exhaust-bypass valve 61 according to a sixth embodiment of the present invention. The exhaust-bypass valve 61 shown in the figure differs from the counterpart in the above-described fifth embodiment in the position of the spring. More specifically, according to this embodiment, a lever 62 that is longer than the above-described lever 8 (refer to the first embodiment) is provided, and a spring (urging means) 63 is provided between the lever 62 and the bulkhead 2. One end of the spring 63 is in contact with the lever 62, and the other end of the spring 63 is secured to a spring bearing 64 on the fixed end (housing). The shaft 7, the joint 9*a* at the tip of the actuator 9, and the contact point of the spring 63 are arranged, in that order, on the lever 62. The spring 63 is extended in the open state shown in FIG. 13. When the valve flap 6 is closed almost completely, as shown in FIG. 14, the spring 63 contracts and exerts an urging force in the direction to open the valve flap 6.

The other components are similar to those in the above-described fifth embodiment. The same components as those in the fifth embodiment are denoted with the same reference numerals, and hence a description thereof will be omitted.

When the load applied to the valve flap 6 increases, the rotation of the valve flap 6 about the shaft 7 becomes more steady due to the urging force of the spring 63, thereby reducing the fluctuation in rotation angle of the valve flap 6 resulting from fluctuations in the load. In particular, the steadiness of the valve flap 6 about the shaft 7 can be increased, compared with the above-described fifth embodiment. Consequently, the slide distance between the shaft 7 and the bushing 13 supporting the shaft 7 is reduced, thus preventing wear. Furthermore, because the direction of the load applied to the valve flap 6 by the gas substantially matches the direction of the load applied to the lever 8 by the spring 63, partial contact between the shaft 7 and the bushing 13 can be decreased.

Like the above-described fifth embodiment, any elastic member can be used for the spring 63. For example, a leaf spring is also acceptable.

[Seventh Embodiment]

An exhaust-bypass valve according to a seventh embodiment of the present invention will now be described with reference to FIG. 15. In this embodiment, the lever according to the above-described fifth or sixth embodiment is additionally provided with a mass (weight). A case where a mass is added to the fifth embodiment will be described below. The same components as those in the fifth embodiment are denoted with the same reference numerals, and hence a description thereof will be omitted.

Figure 15:
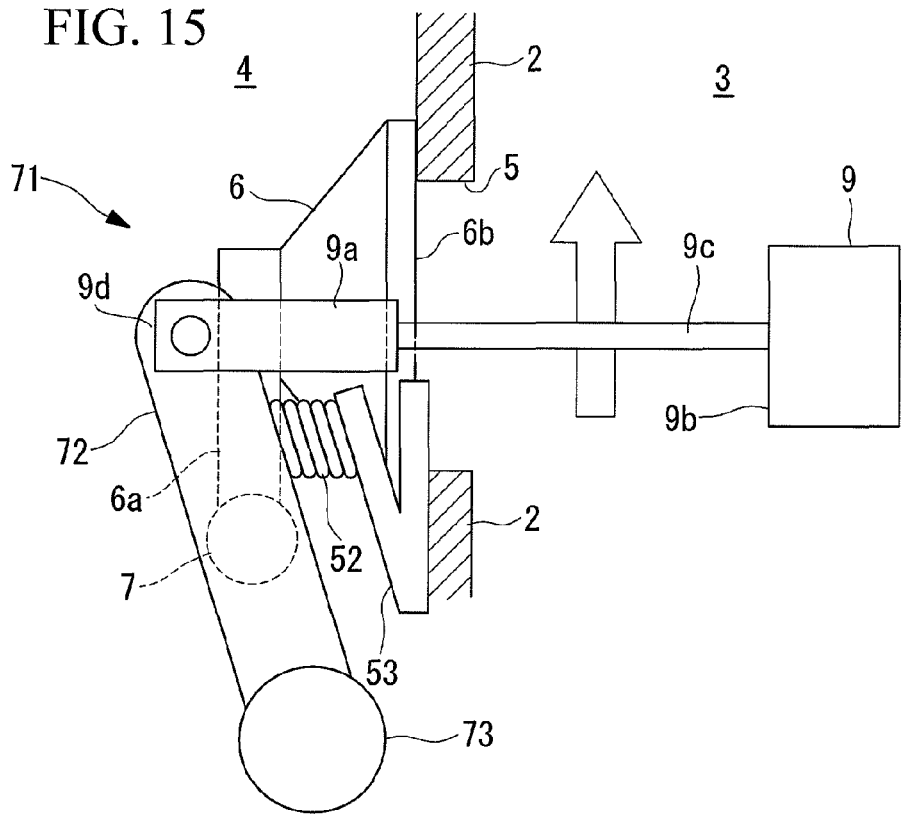
FIG. 15 is a cross-sectional view of an exhaust-bypass valve according to a seventh embodiment of the present invention.

An exhaust-bypass valve 71 shown in FIG. 15 has a lever 72 that is longer than the above-described lever 8 (refer to the fifth embodiment), and a mass (weight) 73 is secured to the lower end of the lever 72. More specifically, the mass 73, the shaft 7, and the contact point of the spring 52 are arranged in that order from bottom to top along the longitudinal direction of the lever 72.

The variable load applied to the valve flap 6 is related to the rotation speed of the engine. In addition, the effect of suppressing fluctuations in rotation angle of the valve flap 6 is more dramatic if the frequency of the variable load applied to the valve flap 6 is lower than the eigenfrequency of the valve flap 6 about the shaft 7. In this embodiment, the steadiness of the valve flap 6 about the shaft can be maintained by adding the mass 73 to the lever 72 to lower the eigenfrequency. As a result, a more marked wear-suppressing effect can be produced with a lower rotation speed of the engine.

Figure 16:
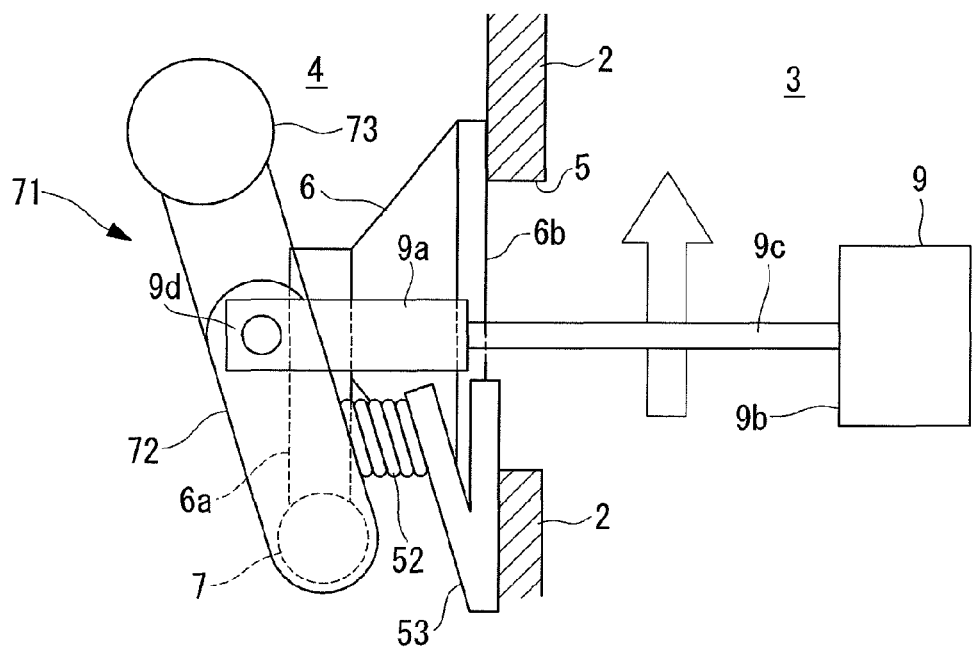
FIG. 16 is a cross-sectional view of a modification of the exhaust-bypass valve according to the seventh embodiment of the present invention.

A similar advantage can be afforded also by providing the mass 73 at the upper end of the lever 72, as shown in FIG. 16.

[Eighth Embodiment]

Figure 17:
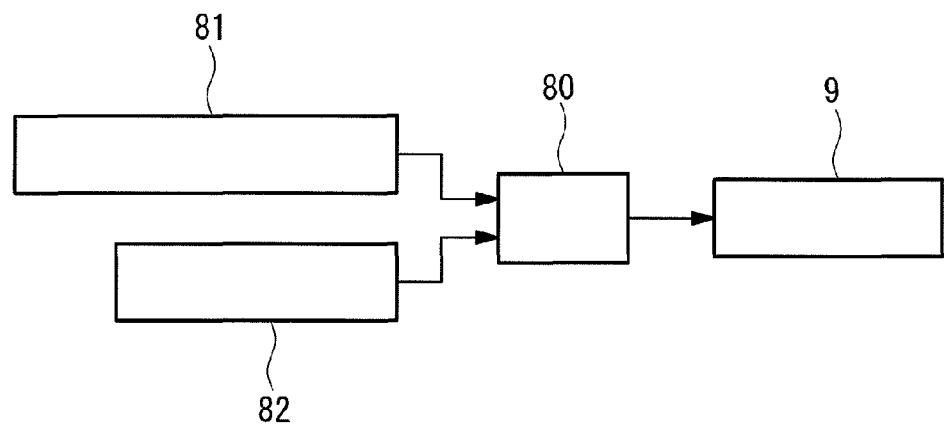
FIG. 17 is a schematic block diagram of a control section of an exhaust-bypass valve according to an eighth embodiment of the present invention.

FIG. 17 is a control block diagram of an exhaust-bypass valve according to this embodiment. The entire structure is the same as that in the above-described first embodiment. The same components as those in the first embodiment are denoted with the same reference numerals, and hence a description thereof will be omitted.

According to this embodiment, a control section 80 that controls the actuator 9 is provided, and the control section 80 receives outputs from an engine torque detector 81 and a gas pressure detector 82. The control section 80 performs control so as to completely close the valve flap 6 in a case where the engine torque is high and the frequency of fluctuations in gas pressure is lower than the eigenfrequency of the valve flap 6 about the rotating shaft. The control section 80 opens the valve flap 6 when the fluctuation in gas pressure exceeds the eigenvalue.

In a case where the engine torque is high, the fluctuation in load applied to the valve flap 6 is more considerable because the fluctuation in gas pressure becomes larger. Furthermore, when the eigenfrequency of the valve flap 6 about the shaft 7 matches the frequency of the variable load, there is a higher risk of increasing wear and breaking the valve due to resonance. To prevent this resonance from occurring and increase the wear-suppressing effect, the control section 80 performs control so as to keep the valve completely closed when the frequency of the variable load applied to the valve flap 6 is equal to or lower than the eigenfrequency and to open the valve when the frequency of the variable load applied to the valve flap 6 exceeds the eigenfrequency and hence there is no risk of producing resonance. As a result, not only can wear be reduced, but also the valve can be prevented from being damaged.

The engine torque may be determined based on the gas pressure. Fluctuation in gas pressure can also be determined based on the rotation speed of the engine.

[Ninth Embodiment]

An exhaust-bypass valve according to a ninth embodiment of the present invention will now be described with reference to FIG. 18. This embodiment is a modification of the above-described fifth or sixth embodiment. A case where a mass is added to the fifth embodiment will be described below. The same components as those in the fifth embodiment are denoted with the same reference numerals, and hence a description thereof will be omitted.

Figure 18:
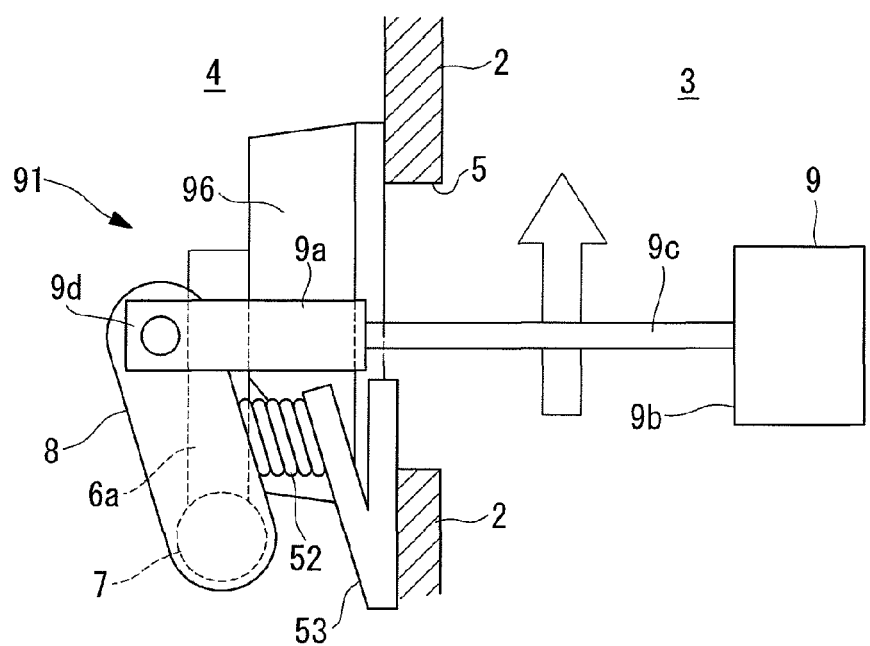
FIG. 18 is a cross-sectional view of an exhaust-bypass valve according to a ninth embodiment of the present invention.

An exhaust-bypass valve 91 of this embodiment, shown in FIG. 18, is provided with a valve flap 96 that has a larger thickness and mass than the valve flap 6 (refer to the fifth embodiment). In short, the valve flap 96 contains a weight.

The valve flap 96 is normally connected with the arm 6*a* with some play. Therefore, addition of a spring (e.g., the spring 52 in the fifth embodiment) to control the movement of the lever 8 may cause the impact load between the valve flap 96 and the arm 6*a* resulting from fluctuation in load to increase. In this embodiment, the moving speed is controlled by increasing the mass of the valve flap 96 to reduce the impact load. Therefore, the fluctuation in rotation angle can be suppressed, thereby reducing the wear of the rotating shaft and preventing the controllability from deteriorating. In addition, because the thickness of the valve flap 96 is increased, the valve flap 96 becomes more robust to reduce the risk of, for example, breakage.

[Tenth Embodiment]

An exhaust-bypass valve according to a tenth embodiment of the present invention will now be described with reference to FIG. 19. This embodiment is a modification of the above-described fifth to ninth embodiments. A modification of the fifth embodiment is described below. The same components as those in the fifth embodiment are denoted with the same reference numerals, and hence a description thereof will be omitted.

In this embodiment, a laminated spring is used in place of the spring 52 in the above-described fifth embodiment.

Figure 19:
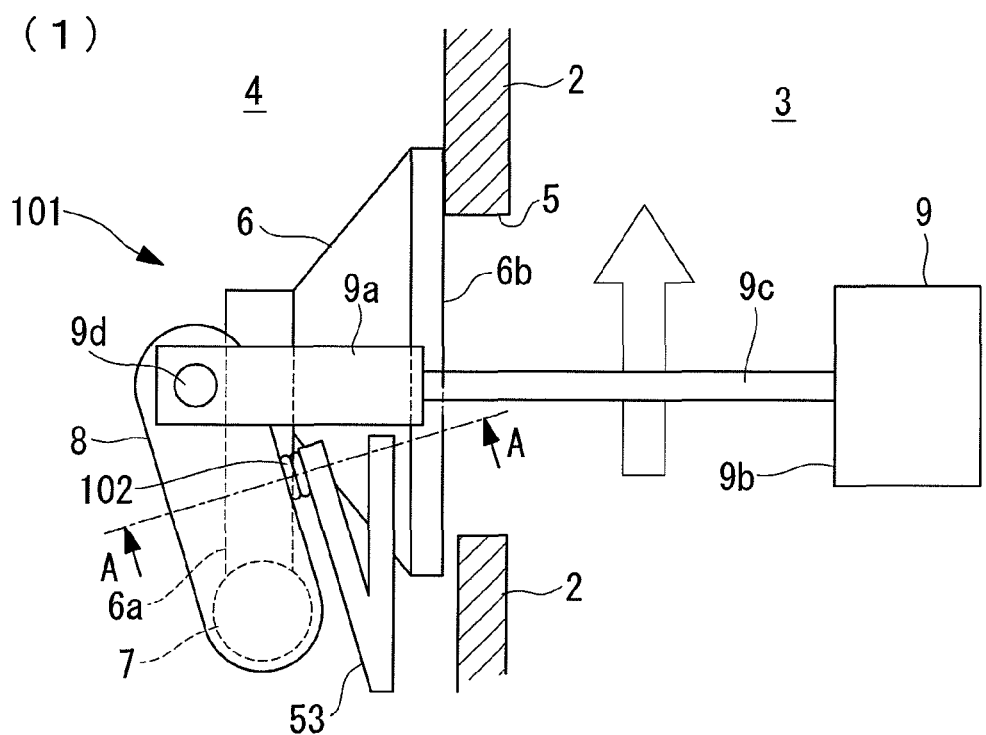
FIG. 19 shows cross-sectional views of an exhaust-bypass valve according to a tenth embodiment of the present invention.
Figure 19:
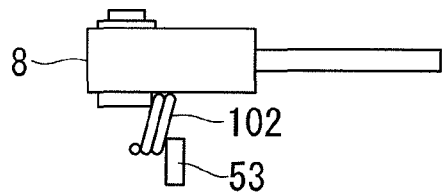

As shown in FIG. 19(1) and FIG. 19(2), which is a cross-sectional view taken along line A-A in FIG. 19(1), an exhaust-bypass valve 101 according to this embodiment employs a laminated spring 102 in place of the spring 52. The laminated spring 102 is disposed between the lever 8 and the spring bearing 53. One end of the laminated spring 102 is in contact with the lever 8, and the other end thereof is secured to the spring bearing 53.

In this example, the phase of a variable load applied to the valve flap 6 is shifted relative to the phase of the fluctuation in rotation angle of the valve about the shaft 7 by enhancing the vibration-damping ability of the spring to suppress the fluctuation in rotation angle. As a result, the wear-reducing effect can be enhanced.

Figure 20:
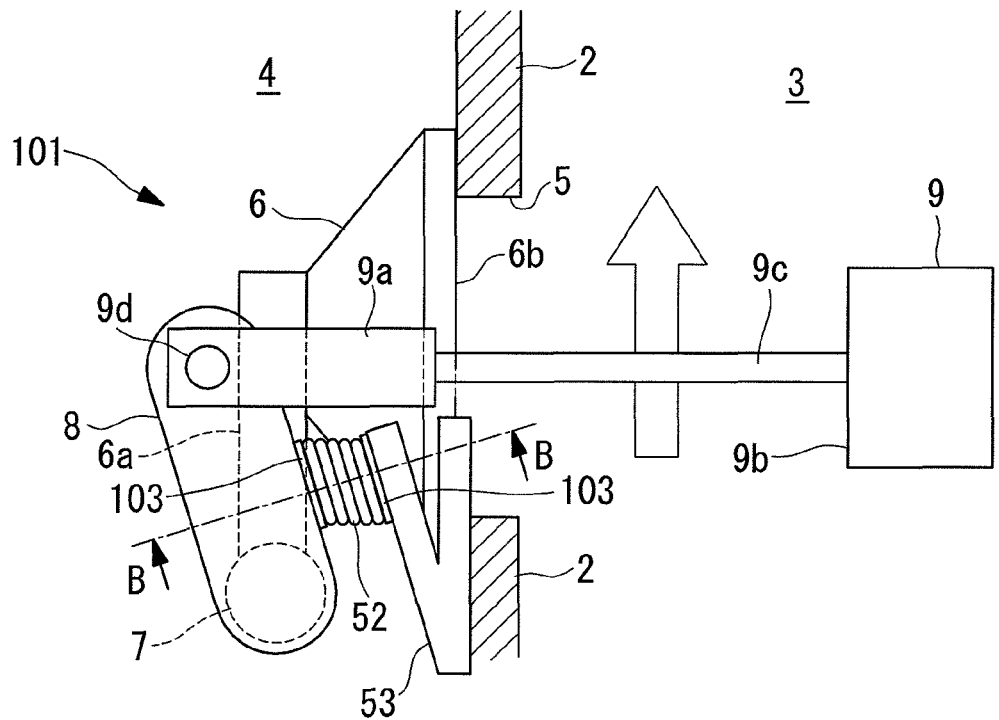
FIG. 20 shows cross-sectional views of a modification of the exhaust-bypass valve according to the tenth embodiment of the present invention.
Figure 20:
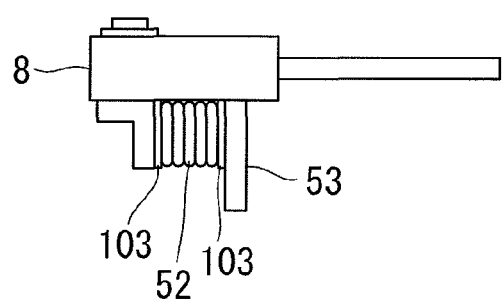

Alternatively, as shown in FIG. 20(1) and FIG. 20(2), which is a cross-sectional view taken along line B-B in FIG. 20(1), a sheet (vibration-damping means) 103 made of material with a high vibration-damping ability (e.g., rubber, plastic) may be disposed at both ends of the spring 52. A leaf spring may also be used in place of the spring 52.

By doing so, the vibration-damping ability of the spring 52 can be enhanced to more effectively control the fluctuation in rotation angle and achieve a higher wear-reducing effect.

[Eleventh Embodiment]

Figure 21:
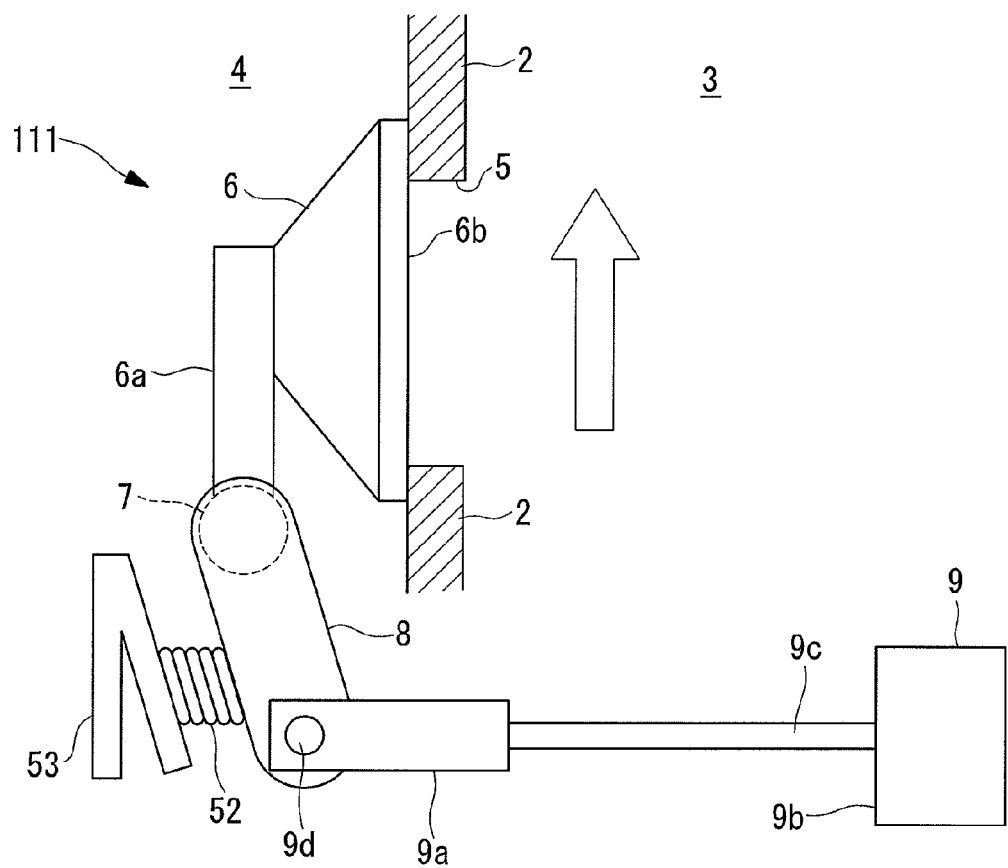
FIG. 21 is a cross-sectional view of an exhaust-bypass valve according to an eleventh embodiment of the present invention.

FIG. 21 shows an exhaust-bypass valve 111 according to an eleventh embodiment of the present invention.

Components such as the valve flap 6 are similar to those in the above-described first embodiment. The same components as those in the first embodiment are denoted with the same reference numerals, and hence a description thereof will be omitted.

In the exhaust-bypass valve 111, the lever 8 and the arm 6a of the valve flap 6 are arranged at an obtuse angle, particularly along a substantially straight line.

Figure 22:
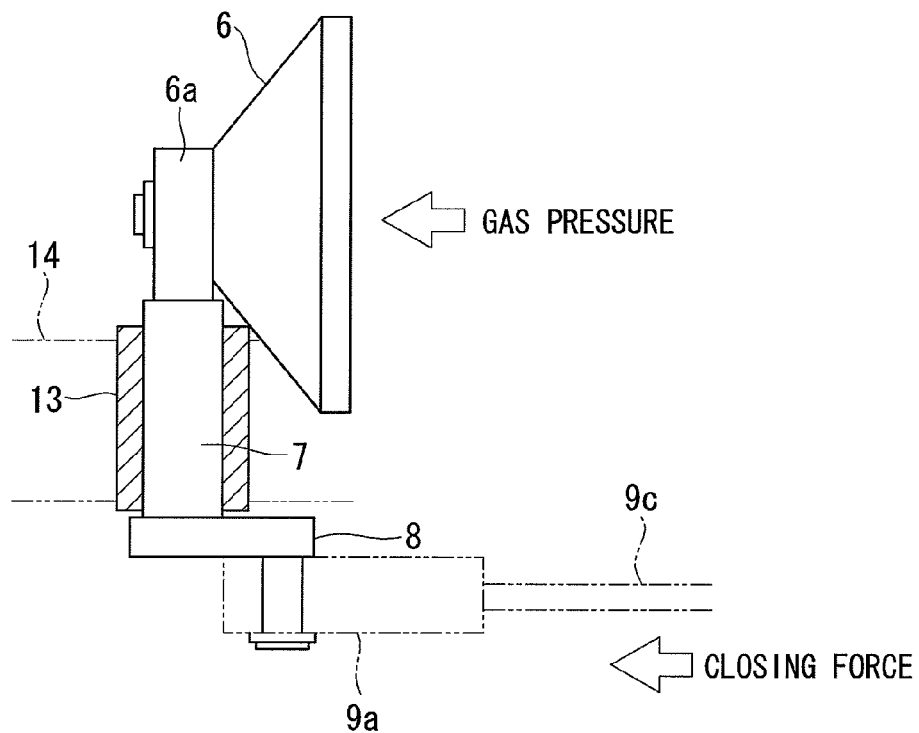
FIG. 22 is a top view of the same exhaust-bypass valve.

Because of this, the direction of the load applied to the valve flap 6 substantially matches the direction of the load applied to the lever 8 by the joint 9a, thereby reducing partial contact between the shaft 7 and the bushing supporting the shaft 7. More specifically, because the direction of the closing force by the actuator 9 matches the direction of gas pressure acting upon the valve flap 6 as shown in FIG. 22, no force acts in a direction for tilting the shaft 7 (refer to FIG. 12(1)). Therefore, the wear of the rotating shaft can be reduced, thereby preventing the controllability from deteriorating.

In addition, like the above-described fifth embodiment, the spring 52 may be provided. This spring 52 is disposed at the opposite side of the lever 8 from the actuator 9 and therefore, exerts an urging force in a direction to open the valve when the valve flap 6 is to be closed. Because of this, when the load applied to the valve flap 6 increases, the rotation of the valve flap 6 about the shaft 7 becomes more steady due to the urging force of the spring 52, thereby reducing the fluctuation in rotation angle of the valve flap 6 resulting from fluctuations in the load.

[Twelfth Embodiment]

Figure 23:
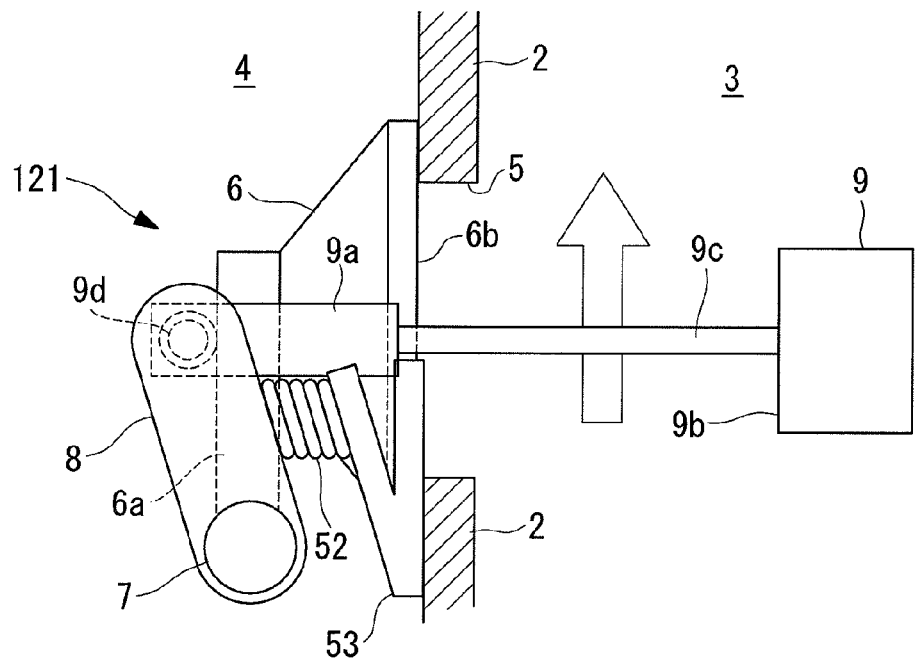
FIG. 23 is a cross-sectional view of an exhaust-bypass valve according to a twelfth embodiment of the present invention.

FIG. 23 shows an exhaust-bypass valve 121 according to a twelfth embodiment of the present invention. This embodiment is a modification of the above-described fifth to eleventh embodiments. The same components as in the fifth embodiment are denoted with the same reference numerals, and hence a description thereof will be omitted.

Components such as the valve flap 6 are similar to those in the above-described first embodiment. The same components as those in the first embodiment are denoted with the same reference numerals, and hence a description thereof will be omitted.

In this embodiment, the pin connecting between the joint 9a and the lever 8 is disposed on the side adjacent to the flap from the lever 8 so that the contact points of the valve flap 6, the lever 8, and the joint 9a of the actuator 9 come closer to the valve flap 6.

Figure 24:
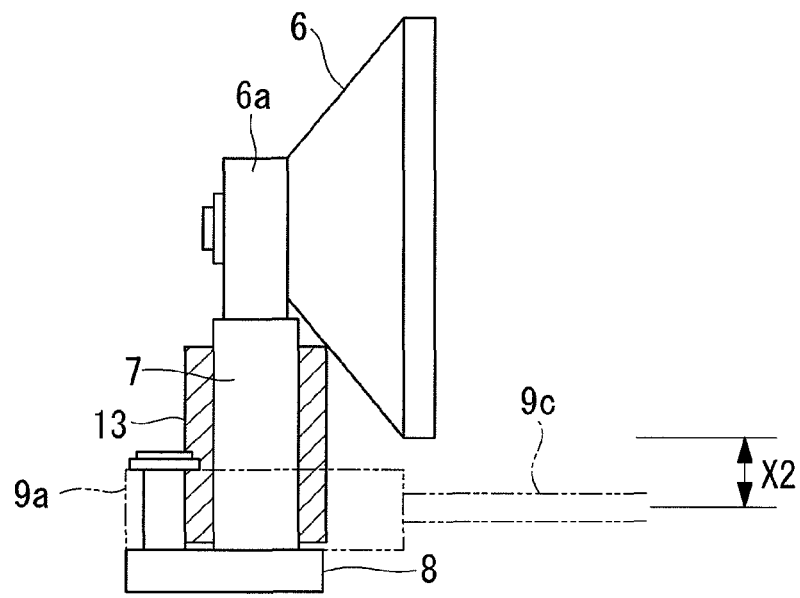
FIG. 24 is a top view of the same exhaust-bypass valve.

Because of this, the load resulting from partial contact between the shaft 7 and the bushing 13 can be reduced. As a result, the wear-suppressing effect can be enhanced. In other words, because the overhang in FIG. 24 is shorter than that in FIG. 12(1) (reference symbol X1→reference symbol X2), the force in a direction for tilting the shaft 7 is reduced in the bushing 13. Therefore, the wear of the rotating shaft can be reduced, thereby preventing the controllability from deteriorating.

Figure 25:
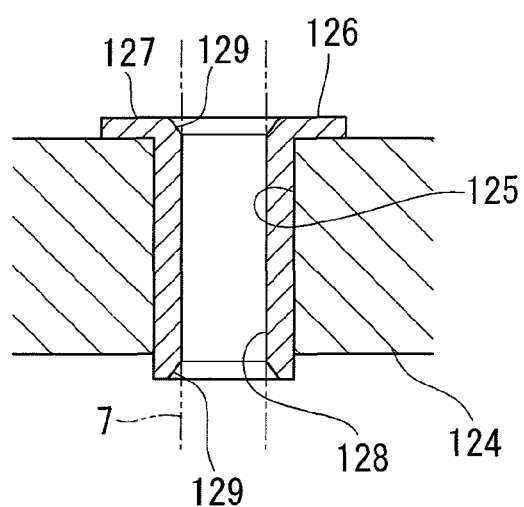
FIG. 25 is a cross-sectional view of a bearing that rotatably supports a valve flap of the exhaust-bypass valve according to the twelfth embodiment of the present invention.

Furthermore, in the above-described first to eleventh embodiments and the example shown in FIG. 23, a taper or an R may be provided at an edge of the bushing supporting the shaft 7. Details in this case are shown in FIG. 25. The shaft 7 is rotatably supported via a substantially cylindrical bushing 126 fitted into a hole 125 in a housing (fixing member) 124. The bushing 126 includes a flange 127 covering the edge of the opening at one end of the hole 125 and a through-hole 128 in which the shaft 7 is disposed. Furthermore, a chamfer 129 is formed at the edge of the opening at both ends of the through-hole 128 of the bushing 126.

Figure 26:
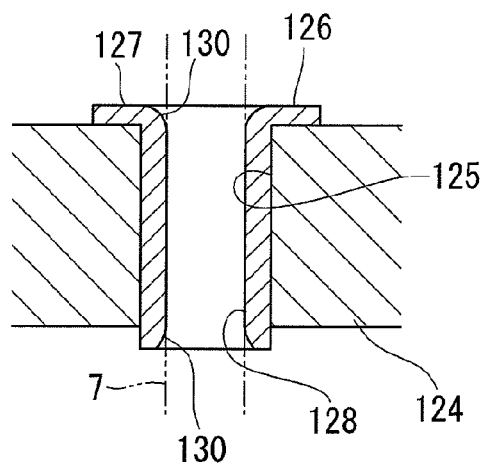
FIG. 26 is a cross-sectional view of a bearing that rotatably supports a valve flap of the exhaust-bypass valve according to the twelfth embodiment of the present invention.
Figure 27:
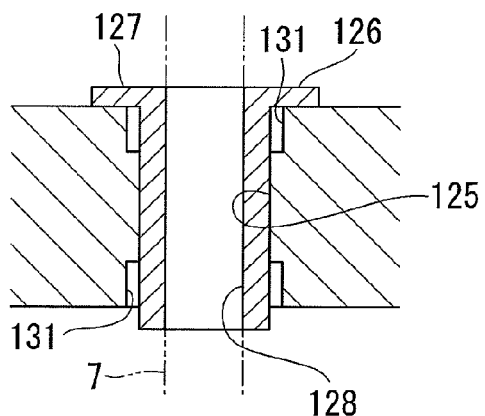
FIG. 27 is a cross-sectional view of a bearing that rotatably supports a valve flap of the exhaust-bypass valve according to the twelfth embodiment of the present invention.

FIG. 26 shows an example where an R portion 130 is formed in place of the chamfer 129. In addition, as shown in FIG. 27, a gap 131 is formed between the outer circumferential wall of the bushing 126 and the wall of the housing 124 at both ends of the bushing 126. The gaps 131 are formed by scraping the wall of the housing 124.

As shown in the above figures, the contact areas near the edges are increased by forming the chamfers 129, the R portions 130, and the gaps 131. As a result, the wear depth can be reduced to suppress looseness which would be considerable if wear occurred.

Figure 28:
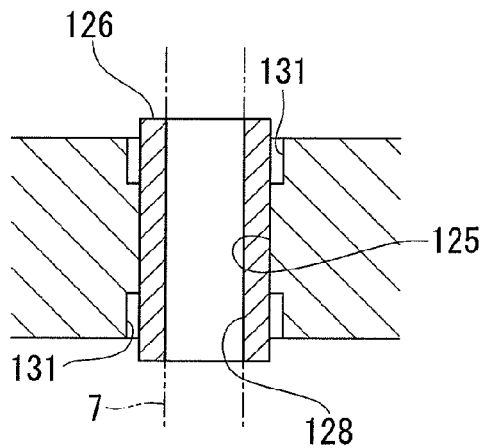
FIG. 28 is a cross-sectional view of a bearing that rotatably supports a valve flap of the exhaust-bypass valve according to the twelfth embodiment of the present invention.

The bushing 126 need not be provided with the flange 127, as shown in FIG. 28.

[Thirteenth Embodiment]

An exhaust-bypass valve 140 according to a thirteenth embodiment of the present invention will now be described with reference to FIG. 29. Components such as the valve flap 6 are similar to those in the above-described first embodiment. The same components as those in the first embodiment are denoted with the same reference numerals, and hence a description thereof will be omitted.

Figure 29:
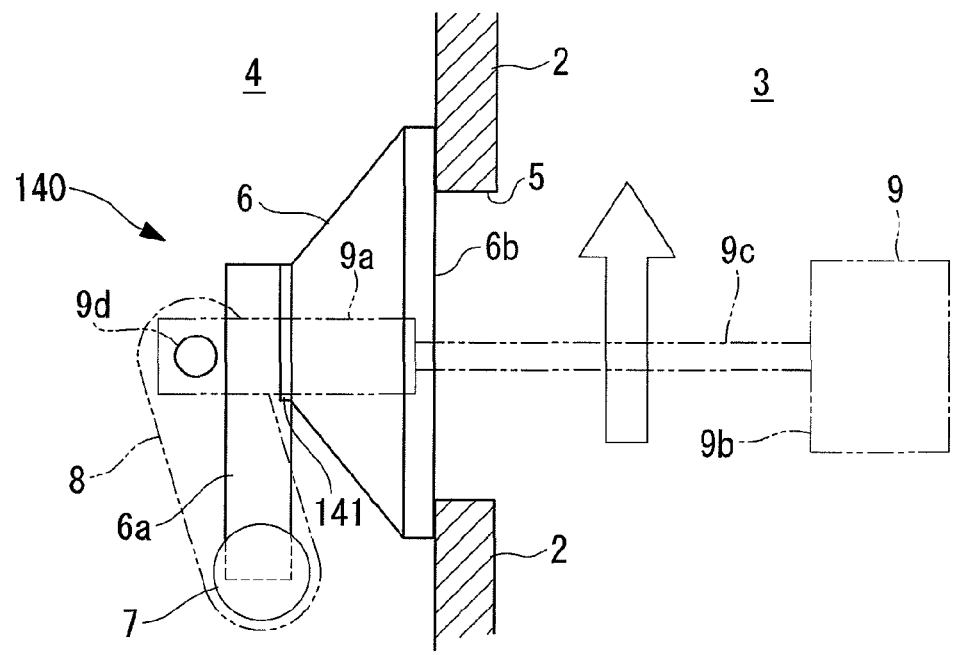
FIG. 29 is a cross-sectional view of an exhaust-bypass valve according to a thirteenth embodiment of the present invention.
Figure 30:
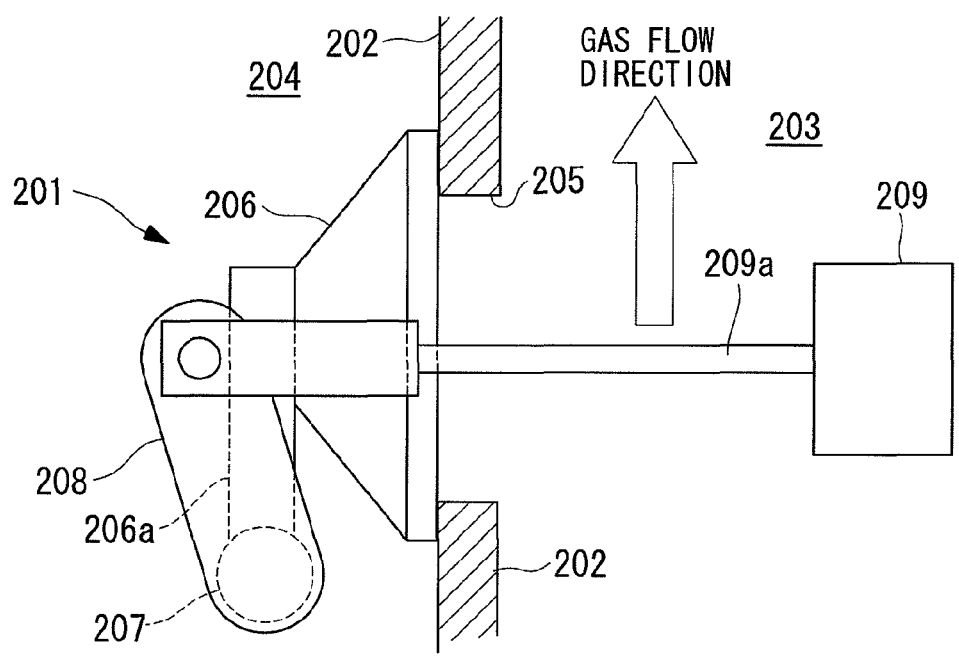
FIG. 30 is a cross-sectional view of a known exhaust-bypass valve, depicting a valve flap in the closed state.
Figure 31:
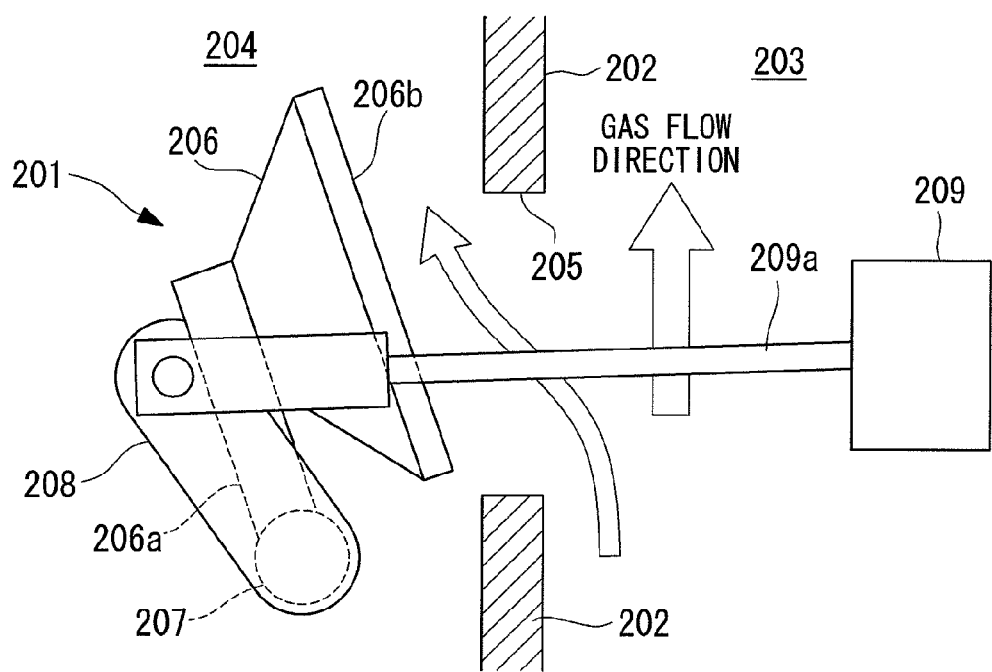
FIG. 31 is a cross-sectional view of a known exhaust-bypass valve, depicting a valve flap in the open state.

As shown in FIG. 29, the exhaust-bypass valve 140 includes a spring (elastic member) 141 between the valve flap 6 and the arm 6a. A sheet made of high damping material can be used in place of the spring.

Normally, the valve flap 6 is connected with the arm 6a with some play to enhance the contact strength between the valve flap 6 and the bulkhead 2. Due to a gap, the valve flap 6 collides with the arm 6a when fluctuation in gas pressure occurs. If this occurs, a heavy impact load may occur, thereby causing fluctuation in the rotation angle of the shaft 7 to become considerable. In this embodiment, however, fluctuation in the rotation angle can be prevented and wear can be suppressed accordingly because the spring 141 is provided.

The invention claimed is:

1. An exhaust-bypass valve of a turbocharger, comprising: a bulkhead that divides a passage at the turbine-inlet side from a passage at the trubine-outlet side, a shunting passage that communicates between a passage at a turbine-inlet side and the passage at a turbine-outlet side and a valve flap that opens and closes the shunting passage, the valve flap opening and closing to shunt a gas flowing through the passage at the turbine-inlet side into the passage at the turbine-outlet side, wherein the valve flap is disposed in the passage at a turbine-outlet side, is supported by an arm supported rotatably about a shaft at one side thereof, and is rotatalby supported at one side thereof serving as a center-of-rotation side, the other side of the valve flap moves away from or towards the bulkhead to open or close the shunting passage, wherein the shunting passage penetrates the bulkhead so as to communicate between a first opening formed in the passage at the turbine-inlet side and a second opening formed in the passage at the turbine-outlet side, wherein, with respect to the gas flow direction in the passage at the turbin-inlet side the first opening is disposed in a downstream side of the second opening, and wherein a tapered portion is provided in a least one of an edge of the valve flap facing the second opening being farthest side of the valve flap from the center-of-rotation side and an edge of the second opening for the shunting passage facing the valve flap being a farthest side of the second opening from the center-of-rotation side of the valve flap.

2. The exhaust-bypass valve of a turbocharger according to claim 1, wherein the valve flap is rotatably supported at the center-of-rotation side, and wherein the side of the valve flap that is farthest from the center of rotation side moves away from or towards the shunting passage to open or close the shunting passage.

* * * * *